(12) United States Patent
Perreault et al.

(10) Patent No.: US 7,940,657 B2
(45) Date of Patent: May 10, 2011

(54) IDENTIFYING ATTACKERS ON A NETWORK

(75) Inventors: John A. Perreault, Hopkinton, MA (US); Shaun Jaikarran Bharrat, Manalapan, NJ (US); Mark Duffy, Lexington, MA (US); Gary Robert McCarthy, Bedford, NH (US); Jian Yang, Boxboro, MA (US); Shiping Li, Acton, MA (US)

(73) Assignee: Sonus Networks, Inc., Westford, MA (US)

( * ) Notice: Subject to any disclaimer, the term of this patent is extended or adjusted under 35 U.S.C. 154(b) by 1120 days.

(21) Appl. No.: 11/565,944

(22) Filed: Dec. 1, 2006

(65) Prior Publication Data

US 2008/0134329 A1 Jun. 5, 2008

(51) Int. Cl.
*G06F 15/16* (2006.01)
(52) U.S. Cl. ............... 370/230; 370/229; 726/2; 726/3; 726/11; 726/13
(58) Field of Classification Search .................. 370/229, 370/230; 380/255–276; 713/150–181; 716/2, 716/3, 11, 13
See application file for complete search history.

(56) References Cited

U.S. PATENT DOCUMENTS

| | | | | |
|---|---|---|---|---|
| 5,473,607 A * | 12/1995 | Hausman et al. | ......... | 370/85.13 |
| 6,084,877 A * | 7/2000 | Egbert et al. | .................. | 370/389 |
| 6,085,241 A | 7/2000 | Otis | | |
| 6,292,483 B1 * | 9/2001 | Kerstein | ........................ | 370/389 |
| 6,292,795 B1 | 9/2001 | Peters et al. | | |
| 6,618,356 B1 * | 9/2003 | Bonaventure | ................. | 370/235 |
| 6,651,099 B1 | 11/2003 | Dietz et al. | | |
| 6,707,946 B1 * | 3/2004 | Marques et al. | .............. | 382/233 |
| 6,826,698 B1 | 11/2004 | Minkin et al. | ................. | 713/201 |
| 6,982,956 B2 * | 1/2006 | Blanc et al. | .................... | 370/235 |
| 6,983,323 B2 * | 1/2006 | Cantrell et al. | ............... | 709/225 |
| 7,007,169 B2 * | 2/2006 | Lingafelt et al. | .............. | 713/188 |
| 7,047,163 B1 | 5/2006 | Chakraborty et al. | | |
| 7,058,974 B1 * | 6/2006 | Maher, III et al. | .............. | 726/13 |
| 7,120,931 B1 * | 10/2006 | Cheriton | ......................... | 726/13 |

(Continued)

FOREIGN PATENT DOCUMENTS

| | | |
|---|---|---|
| EP | 13677981 | 3/2003 |
| WO | 02/19661 A2 * | 3/2002 |
| WO | WO-2006-037809 | 4/2006 |
| WO | 2006/081507 A1 * | 8/2006 |

OTHER PUBLICATIONS

Non-Final Office Action in U.S. Appl. No. 11/565,942, dated Jan. 8, 2009 (19 total pages).

(Continued)

*Primary Examiner* — William Trost, IV
*Assistant Examiner* — Charles C Jiang
(74) *Attorney, Agent, or Firm* — Proskauer Rose LLP

(57) ABSTRACT

Described are computer-based methods and apparatuses, including computer program products, for identifying attackers on a network. A data packet is filtered by a multi-tiered filtering and transmission system. Data packets matching the first tier filter are discarded. Data packets matching the second tier filter are transmitted to an output module based on a criterion. Data packets in the third tier filter are hashed into bins and data packets matching an entry in the bin are transmitted to the output module based on a criterion for the bin. Data packets in the fourth tier transmission system are transmitted to the output module based on a criterion. Data packets that do not meet the criterion for transmission to the output module are transmitted to an attack identification module which analyzes the data packets to identify attacks.

27 Claims, 13 Drawing Sheets

U.S. PATENT DOCUMENTS

| | | | | |
|---|---|---|---|---|
| 2001/0007133 | A1 | 7/2001 | Moriconi et al. | 713/201 |
| 2002/0085586 | A1 | 7/2002 | Tzeng | |
| 2003/0084329 | A1 | 5/2003 | Tarquini | |
| 2003/0091042 | A1 | 5/2003 | Lor | |
| 2003/0156590 | A1 | 8/2003 | Paul et al. | |
| 2003/0182291 | A1* | 9/2003 | Kurupati et al. | 707/100 |
| 2004/0022193 | A1* | 2/2004 | Davies et al. | 370/235 |
| 2004/0054925 | A1 | 3/2004 | Etheridge | 713/201 |
| 2004/0141462 | A1* | 7/2004 | Mistry et al. | 370/229 |
| 2004/0158612 | A1 | 8/2004 | Concannon | |
| 2004/0172557 | A1 | 9/2004 | Nakae et al. | |
| 2005/0086491 | A1 | 4/2005 | Haugh et al. | |
| 2005/0105464 | A1* | 5/2005 | Acharya et al. | 370/229 |
| 2005/0157647 | A1 | 7/2005 | Sterne et al. | |
| 2005/0226155 | A1* | 10/2005 | St. Denis et al. | 370/235 |
| 2005/0240993 | A1 | 10/2005 | Treadwell et al. | 726/13 |
| 2006/0085554 | A1* | 4/2006 | Shah et al. | 709/235 |
| 2006/0184792 | A1* | 8/2006 | Berlin | 713/165 |
| 2007/0019543 | A1* | 1/2007 | Wei et al. | 370/229 |
| 2007/0070889 | A1 | 3/2007 | Laboy et al. | |
| 2007/0118894 | A1 | 5/2007 | Bhatia | |
| 2007/0208948 | A1 | 9/2007 | Costa-Requena et al. | |
| 2008/0123542 | A1 | 5/2008 | Karlsson | |
| 2008/0134327 | A1 | 6/2008 | Bharrat et al. | |
| 2008/0134328 | A1 | 6/2008 | Yang et al. | |
| 2009/0217369 | A1* | 8/2009 | Abeni et al. | 726/13 |

OTHER PUBLICATIONS

PCT International Search Report and Written Opinion for International Application No. PCT/US2007/086065, dated Dec. 29, 2008 (19 total pages).

Non-Final Office Action in U.S. Appl. No. 11/565,940, dated Jan. 22, 2009 (22 total pages).

"Distributed Denial of Service Attack Tools," Internet Security Systems, published Mar. 1, 2000, 8 pages.

Peng, et al., "Protection from Distributed Denial of Service Attack Using History-based IP Filtering," The University of Melbourne, Department of Electrical and Electronic Engineering, published May 11, 2003, 6 pages.

Office Action in U.S. Appl. No. 11/565,942, dated Aug. 7, 2009, 25 pages.

Office Action in U.S. Appl. No. 11/565,942, dated Feb. 17, 2010, 15 pages.

Office Action in U.S. Appl. No. 11/565,940, dated Jul. 15, 2009, 9 pages.

Notice of Allowance in U.S. Appl. No. 11/565,940, dated Dec. 7, 2009, 3 pages.

Ivers, Dr. W.D., "Introducing Clubessential's New Spam Filter," Clubessential, Mar. 29, 2005, 2 pages.

Spitznagel, E.W., "High Performance Packet Classification," Washington University in St. Louis, School of Engineering & Applied Science, Mar. 31, 2004, 24 pages.

Ioannidis, et al., "Implementing Pushback: Router-Based Defense Against DDoS Attacks," Network and Distributed System Security Symposium Conference Proceedings, 2002, 10 pages.

Specht, et al., "Taxonomies of Distributed Denial of Service Networks, Attacks, Tools, and Countermeasures," Department of Electrical Engineering, Princeton Architecture Laboratory for Multimedia and Security, May 16, 2003, 20 pages.

Harris, E., "The Next Step in the Spam Control War: Greylisting," http://projects.puremagic.com/greylisting/whitepaper.html, Aug. 8, 2003, 16 pages.

* cited by examiner

IDENTIFYING ATTACKERS ON A NETWORK

CROSS REFERENCES TO RELATED APPLICATIONS

This application relates to two co-pending applications entitled "Filtering and Policing for Defending Against Denial of Service Attacks on a Network," U.S. patent application Ser. No. 11/565,940; and entitled "Scalable Filtering and Policing Mechanism for Protecting User Traffic in a Network," U.S. patent application Ser. No. 11/565,942.

FIELD OF THE INVENTION

The present invention relates generally to computer-based methods and apparatuses, including computer program products, for identifying attackers on a network.

BACKGROUND

The increased use of networks across the globe has been accompanied by an increase in attacks to those networks. The network attacks come in a variety of ways including denial of service (DOS) attacks. A DOS attack can cause devastating damage not only to the flow of data on the network, but to a company's reputation for allowing the attack to proceed unimpeded and ultimately to a company's bottom line finances. A DOS attack can be described as a malicious attacker generating interfering traffic with the intention to degrade, disrupt, or deny the service provided by the network to legitimate users.

The DOS attacks have been increasing along with the rise in network activity. Companies have responded by identifying packets from legitimate users and allowing those packets onto the network. However, when the number of users is large, it becomes unfeasible to analyze each packet using a list of users. Hardware solutions, such as content-addressable memory (CAM) based search engines, are also used to handle increased number of users. However, CAM hardware is expensive, consumes excess power, and generates extra heat.

Since DOS attacks have been increasing, it is important for companies to have a way to protect their networks from attacks. The DOS attacks take resources away from legitimate users which are wasted on the data packets from the attackers. DOS attacks not only waste network resources, but they also cause companies to lose money and goodwill from customers who use the company's network. Since DOS attacks are increasing, it is important for companies to have a system for defending networks from such attacks.

SUMMARY OF THE INVENTION

One approach to defending attacks on a network is filtering data on a network. In one aspect, there is a method of filtering data on a network. The method includes receiving data packets at a no access list module, analyzing the data packets using a no access list, and generating a first set of data packets that do not match the no access list. The method further includes receiving the first set of data packets at a first access list module, analyzing the first set of data packets using a first access list, and generating a second set of data packets that do not match the first access list. The method further includes receiving the second set of data packets at a second access list module, analyzing the second set of data packets using a second access list, and generating a third set of data packets that do not match the second access list.

In another aspect, there is a computer program product for the filtering data on a network. The computer program product is tangibly embodied in an information carrier. The computer program product includes instructions being operable to cause a data processing apparatus to receive data packets at a no access list module, analyze the data packets using a no access list, and generate a first set of data packets that do not match the no access list. The first set of data packets are received at a first access list module, analyzed using a first access list, and a second set of data packets are generated that do not match the first access list. The second set of data packets are received at a second access list module, analyzed using a second access list, and a third set of data packets are generated that do not match the second access list.

In another aspect, there is a system for filtering data on a network, the system includes a no access list module, a first access list module, and a second access list module. The no access list module receives data packets from an input module and generates a first set of data packets that do not match a no access list. The first access list module receives the first set of data packets from the no access list module and generates a second set of data packets that do not match a first access list. The second access list module receives the second set of data packets from the first access list module and generates a third set of data packets that do not match a second access list.

In another aspect, there is a system for filtering data on a network, the system includes a means for receiving data packets, a means for receiving the first set of data packets, and a means for receiving the second set of data packets. The means for receiving data packets receives data packets from an input module and generates a first set of data packets that do not match a no access list. The means for receiving the first set of data packets receives the first set of data packets and generates a second set of data packets that do not match a first access list. The means for receiving the second set of data packets receives the second set of data packets and generates a third set of data packets that do not match a second access list.

In another approach, the data on a network is policed. In another aspect, there is a method for policing data on a network. The method includes receiving a data packet at a index module, hashing the data packet using one or more fields in the data packet to generate a bin identification and a user signature, and processing the bin identification to associate the user signature with a first bin included in a plurality of bins. The method further includes comparing at the first bin the user signature to zero or more stored user signatures associated with the first bin, transmitting the data packet to a transmission module based on the comparing, and transmitting, by the transmission module, the data packet to an output module based on a criterion.

In another aspect, there is a computer program product for policing data on a network. The computer program product is tangibly embodied in an information carrier. The computer program product includes instructions being operable to cause a data processing apparatus to receive a data packet at a index module, hash the data packet using one or more fields in the data packet to generate a bin identification and a user signature, and process the bin identification to associate the user signature with a first bin included in a plurality of bins. The first bin compares the user signature to zero or more stored user signatures associated with the first bin and transmits the data packet to a transmission module based on the comparing. The transmission module transmits the data packet to an output module based on a criterion.

In another aspect, there is a system for policing data on a network. The system includes an index module, a bin module, and a transmission module. The index module receives a data packet, hashes the data packet to generate a bin identification and a user signature, and associates the bin identification of the data packet to a first bin included in a plurality of bins. The bin module compares the user signature to zero or more stored user signatures associated with the first bin. The transmission module transmits a matched data packet to an output module based on a criterion.

In another aspect, there is a system for policing data on a network. The system includes a means for receiving a data packet, a means for comparing the user signature, and a means for transmitting a matched data packet. The means for receiving a data packet receives a data packet, hashes the data packet to generate a bin identification and a user signature, and associates the bin identification of the data packet to a first bin. The means for comparing the user signature compares the user signature to zero or more stored user signatures associated with the first bin. The means for transmitting a matched data packet transmits a matched data packet to an output module based on a criterion.

In another approach, the data on a network is analyzed to identify attackers. In another aspect, there is a method for identifying attackers on a network. The method includes receiving a data packet at a discard processing module and generating a discard entry for the data packet. The method further includes receiving the discard entry at a digest index module and hashing the discard entry using one or more fields in the discard entry to generate a bin identification and a user signature. The method further includes processing the bin identification to associate the user signature with a first bin included in a plurality of bins and processing the discard entry at the first bin.

In another aspect, there is a computer program product for analyzing data on a network to identify attackers. The computer program product is tangibly embodied in an information carrier and includes instructions being operable to cause a data processing apparatus to receive a data packet at a discard processing module and generate a discard entry for the data packet. A digest index module receives the discard entry, hashes the discard entry using one or more fields in the discard entry to generate a bin identification and a user signature, and processes the bin identification to associate the user signature with a first bin included in a plurality of bins. The first bin processes the discard entry.

In another aspect, there is a system for identifying attackers on a network. The system includes a discard processing module, a digest index module, and a first digest bin module. The discard processing module receives a data packet and generates a discard entry. The digest index module receives the discard entry, hashes the discard entry to generate a bin identification and a user signature, and processes the bin identification to associate the user signature with a first digest bin module included in a plurality of digest bin modules. The first digest bin module processes the discard entry.

In another aspect, there is a system for identifying attackers on a network. The system includes a means for receiving a data packet, a means for receiving the discard entry, and a means for processing. The means for receiving a data packet receives a data packet and generates a discard entry. The means for receiving the discard entry receives the discard entry, hashes the discard entry to generate a bin identification and a user signature, and processes the bin identification to associate the user signature with a first digest bin module included in a plurality of digest bin modules. The means for processing process the discard entry.

In other examples, any of the aspects above can include one or more of the following features. The no access list includes a list of identifiers indicating which data packets are not allowed to be transmitted to an output module. The list of identifiers for the no access list includes identifying information associated with an attacker user, a field associated with the data packet, and/or meta-data associated with the data packet. The first access list includes a list of identifiers indicating which data packets are allowed to be transmitted to an output module. The list of identifiers for the first access list includes identifying information associated with a high bandwidth user, identifying information associated with an important user, a field associated with the data packet, and/or meta-data associated with the data packet. The second access list includes a list of identifiers indicating which data packets are allowed to be transmitted to an output module. The list of identifiers for the second access list includes identifying information associated with a low bandwidth user, identifying information associated with a standard user, a field associated with the data packet, and/or meta-data associated with the data packet.

In some examples, the data packet is not associated with a user of the system. The bin identification and the user signature generated from the hash of the data packet match one of the stored user signatures associated with the first bin. The probability of the match is low. The data packet is transmitted to the transmission module for transmission to the output module based on the criterion.

In yet other examples, the first access list module generates a fourth set of data packets that match the first access list and transmits the fourth set of data packets to an output module based on a criterion.

In other examples, the first access list module generates a sixth set of data packets that includes data packets from the fourth set of data packets that are not transmitted to the output module. An attack identification module receives the sixth set of data packets and analyzes the sixth set of data packets to identify network attackers. The analysis at the attack identification module includes calculating the number of data packets associated together using other identifying information associated with the data packets, adding the number of data packets to an attack number list, and sorting the attack number list by number of data packets. The attack identification module can generate one or more no access list entries. The no access list is received at the no access list module and added to the no access list.

In other examples, the second access list module generates a fifth set of data packets that match the second access list, transmits to an output module the fifth set of data packets using rate control, and generates a seventh set of data packets that comprises data packets from the fifth set of data packets that are not transmitted to the output module. The attack identification module receives the seventh set of data packets and analyzes the seventh set of data packets.

In yet other examples, a transmission module receives the third set of data packets, generates an eighth set of data packets, transmits to an output module the eighth set of data packets using rate control, and generates a ninth set of data packets that comprises data packets from the eighth set of data packets that are not transmitted to the output module. The attack identification module receives the ninth set of data packets and analyzes the ninth set of data packets.

In yet other examples, the no access list module generates a tenth set of data packets that match the no access list. A discard module receives the tenth set of data packets and discards the tenth set of data packets.

In other examples, the second access list is indexed using a field associated with the data packet, meta-data associated with the data packet, and/or a hash thereof. The second access list includes more entries than the first access list. The second access list includes an indexed plurality of lists.

In yet other examples, the one or more fields in the data packet is a port number, an Ethernet virtual local area network (VLAN) tag, meta-data associated with the data packet, a receiver interface, a source IP address, an incoming logical IP address, a destination IP address, a source MAC address, and/or a destination MAC address.

In other examples, the stored user signatures are modified by an admission control module. The modification is an addition, a subtraction, and/or an edit of the stored user signatures. The admission control module processes a request for service to the output module and determines if and how to modify the stored user signatures. The modification is predicated upon a successful authentication to the admission control module.

In yet other examples, the admission control module receives a request for service. The admission control module authenticates the request for service. The request for service is processed by the admission control module to add, subtract, and/or edit the list of identifiers associated with the first access list.

In other examples, the criterion is rate control. The rate control is a rate limit. The rate limit corresponds to a number of stored user signatures in the matched bin. The rate limit is an amount of data over a set time. The rate limit is a packet rate limit, a byte rate limit, a steady-state rate limit, and/or a burst limit. The index module hashes part or all of the data packet. The bin module compares part or all of the user signature to part or all of the stored user signatures.

In yet other examples, the discard entry comprises identifying information associated with the data packet. The identifying information is a network address, a network subnet address, an IP address, a MAC address, a networking protocol header field, meta-data associated with the data packet, an arrival interface, a destination interface, and/or an origination interface,. The count entry is incremented for every data packet received at the discard processing module.

In other examples, the processing of the discard entry at the first bin includes comparing the user signature of the discard entry to one or more stored user signatures associated with the first bin. If the user signature of the discard entry matches a stored user signature, then a hit counter is incremented on a first digest entry associated with the stored user signature. If the user signature of the discard entry does not match the one or more stored user signatures associated with the first bin, then the discard entry is processed into a digest entry and the digest entry is added to the first bin. The digest entry includes a timestamp, a hit counter, a packet field, packet meta data, and/or an uniqueness indicator.

In other examples, the first bin is processed to determine capacity of the first bin and each digest entry of the first bin is processed based on the capacity to determine age and hit count. A second digest entry is deleted based on the age and the hit count and an overwrite count is incremented. The overwrite count is processed. If no second digest entry can be deleted based on the age and the hit count, then the discard entry is deleted and a discard count is incremented. The discard count is processed.

In yet other examples, the hit counter and the timestamp of each digest entry in the plurality of bins is processed and a high rate list including the value in the hit count of each digest entry is generated. The high rate list is sorted by the rate. A no access list entry is generated from one or more selected entries of the high rate list. The no access list entry is received at a no access list module and added to a no access list.

In other examples, the timestamp and the hit counter of each digest entry in the plurality of bins is processed. The timestamp can, for example, be a plurality of time entries. A hit rate list can be generated based on the processing of the timestamp and the hit counter of each digest entry.

Any of the aspects and examples above can provide one or more of the following advantages. The data packets are filtered by tiered filters to prevent attackers from successfully implementing a denial of service attack against the protected network. The tiered filtering of data packets allows known attackers to quickly be discarded and larger customers of the network to quickly be allowed access to the network. The tiered filtering also allows standard users access to the network while balancing the need to filter out data packets from attackers.

Other advantages include the third tier filtering which is a second access list. The second access list can process hundreds of thousands of user signatures because of the distribution of the user signatures across a plurality of bins. The hash function allows for the size of the user signatures to vary between the bins and the distribution of the data packets across the bins. The number of bins, the size of the user signatures, and the hash function can be adjusted to the needs of the protected network to allow for both scalability and granularity of the third tier filtering.

Other advantages include the transmission of packets to the protected network based on a criterion. The criterion can be a rate control mechanism, which can be a rate limit. For example, the rate limit is placed on the second tiered filter which allows large customers onto the network and the rate limit protects other customers of the network from an attack from data packets that are allowed through the second tiered filter by limiting the number of data packets allowed onto the network during a set time period. The rate limit is, for example, placed on each bin in the third tiered filter which allows standard customers onto the network to ensure that even if an attacker is allowed through one of the bins, the attacker will be limited by the output rate limit of the bin which will reduce the negative affect of the attack.

Other advantages include the transmission of packets from a bin in the third tier filter based on a criterion. The criterion is associated with each bin because even if the data packets of an attack match a user signature in a bin, then only the customers associated with that bin will be affected by the attack and the customers associated with the rest of the system will not be affected. An advantage of using bins for the matching and transmission includes the increased number of customers that can be stored in the bins using the indexing and hashing system and the decrease in the number of customers who are affected when one of the bins receive data packets associated with an attack.

Other advantages include the use of a heterogeneous combination of packet classification mechanisms with associated filtering and transmission control actions which provides for a holistic ability to filter and rate control data packets on a network. One of the advantages of using a heterogeneous combination of packet classification mechanisms is that the different classes of data packets are routed according to the data packet's value to the network (e.g., data packets from important clients are identified and policed by mechanisms with different cost and/or performance tradeoffs than data packets from standard clients). An advantage of using different mechanisms is that each mechanism is optimized for a different characteristic (e.g., speed of transmission, accuracy of match).

Other advantages include the transmission regulation of each data packet before the data packet is transmitted to the output module. One of the advantages to transmission regulation is that if a trusted user of data packets is used to host an attack, then the data packets from the trusted user are still regulated so that the data packets of other users are not adversely affected.

Other advantages include the analysis of packets to determine attackers of the network. The analysis receives the excess data packets from the filtering and transmission modules and processes the data packets to associate data packets together based on common characteristics such a subnet address. The associated data packets are analyzed to determine the worst offenders (e.g., the entries with the highest count of data packets). The worst offenders are then added to the first tiered filter to stop access when the data packets first enter the system. The feedback mechanism of processing the excess data packets allows for an automated system of protecting the network from attackers.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

DETAILED DESCRIPTION

In general overview, data packets are filtered by a multi-tiered filtering and transmission system. The data packets matching the first tier filter (e.g., no access list) are discarded and the remaining data packets are transmitted to the second tier. The data packets matching the second tier filter (e.g., first access list) are transmitted to an output module based on a criterion (e.g., rate limit). If the matched data packets are outside of the criterion, then those data packets are transmitted to an attack identification module for analysis. The data packets not matching the second tier filter are transmitted to the third tier.

The data packets in the third tier filter (e.g., second access list) are hashed into bins and data packets matching an entry in the matched bin are transmitted to the output module based on a criterion (e.g., rate limit) for the bin. If the matched data packets are outside of the criterion, then those data packets are transmitted to an attack identification module for analysis. The data packets not matching the third tier filter are transmitted to the fourth tier. The data packets in the fourth tier transmission system are transmitted to the output module based on a criterion (e.g., rate limit). The data packets that do not meet the criterion for transmission to the network are transmitted to the attack identification module for analysis. The attack identification module analyzes the data packets to identify attacks.

Figure 1:
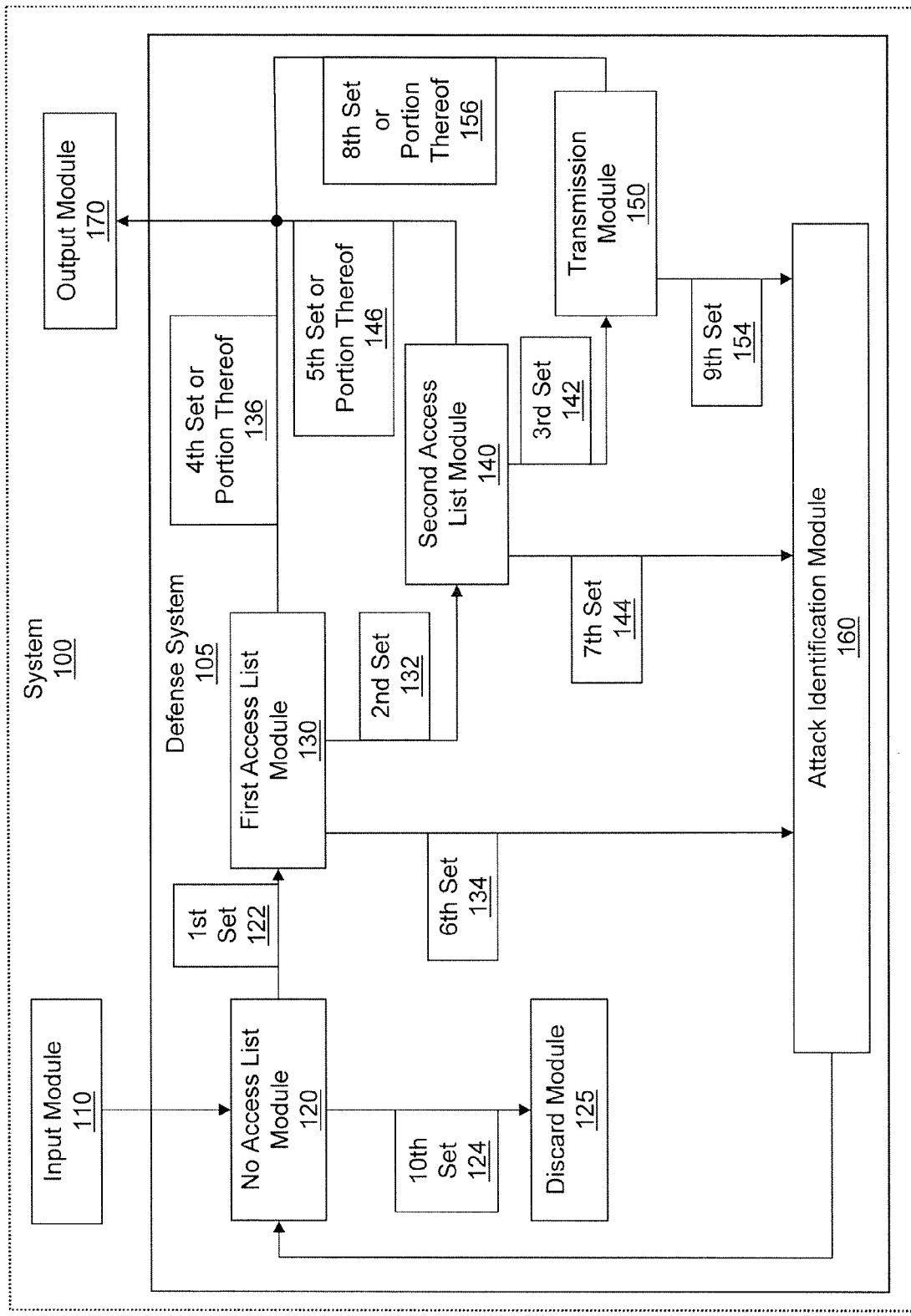
FIG. 1 is a functional block diagram of an exemplary system which filters data packets from an input module for transmission to an output module.

FIG. 1 is a functional block diagram of an exemplary defense system 105 in a system 100 which filters data packets from an input module 110 for transmission to an output module 170. The data packets are transmitted to the defense system 105 from the input module 110. In some examples, the system 100 is a digital signal processor (DSP), an integrated circuit (IC), a field programmable gate array (FPGA), a computer, a network, a network processor, and/or a part thereof. The defense system 105 can, for example, be a DSP, an IC, a FPGA, a computer, a network, a network processor, a part thereof, and/or a part of the system 100. In some examples, the input module is a network, a processor in the system 100, a processor card in the system 100, a network interface card (NIC) in the system 100, a DSP, an IC, a FPGA, a computer, a network, a memory module (e.g., volatile memory, non-volatile memory), a network processor, other types of processing modules, a part thereof, and/or a part of the system 100. The output module can, for example, be a network, a processor in the system 100, a processor card in the system 100, a NIC in the system 100, a DSP, an IC, a FPGA, a computer, a network, a memory module (e.g., volatile memory, non-volatile memory), a network processor, other types of processing modules, a part thereof, and/or a part of the system 100. The transmission of data packets from the input module 110 can be through a packet-based network and/or a circuit-based network. The transmission of data packets from the output module 170 can be through a packet-based network and/or a circuit-based network.

Although the defense system 105 is shown with the data packets coming from the input module 110, other examples include a transmitting device that transmits the data packets. The transmitting device is, for example, located on the input module 110 or is located on a separate network that transmits the data packets to the input module 110. For example, a data packet is transmitted from a transmitting device on a separate network. The data packet is transmitted from the separate network to the input module 110. The input module 110 transmits the data packets to the system 100 for filtering.

The data packets are received at a no access list module 120. The no access list module 120 analyzes the data packets using a no access list. The no access list includes, for example, a list of identifiers indicating which data packets are not allowed to be transmitted to the output module 170. The list of identifiers includes identifying information associated with an attacker user, a field associated with the data packet (e.g., a network protocol header field, a receiver address, a network address, a network subnet address, an internet protocol (IP) address, a media access control (MAC) address, a receiver address, an ingress interface, a multiprotocol label switching (MPLS) tag), and/or meta-data associated with the data packet.

A first set 122 of data packets is generated from the data packets that do not match the no access list. The first set 122 of data packets is transmitted to the first access list module 130. A tenth set 124 of data packets is generated from the data packets that do match the no access list. The tenth set 124 of data packets is transmitted to the discard module 125. The discard module 125 discards the tenth set 124 of data packets. The discard of the tenth set 124 of data packets includes, for example, deleting the tenth set 124 of data packets from the defense system 105 and/or transmitting the tenth set 124 of data packets to a storage module for processing (e.g., analyzing the discarded data packets to check for data packets that were improperly discarded).

The matching of the no access list includes, for example, the comparison of part or all of the list of identifiers with the information associated with the data packets. For example, a data packet with the IP address of 10.99.99.99 is processed by the no access list module 120. The no access list includes the network subnet address of 10.99.99.0. The information associated with the data packet, IP address 10.99.99.99, is analyzed using the no access list. Since the information associated with the data packet, IP address 10.99.99.99, matches part of the no access list, the data packet is part or all of the tenth set 124 of data packets and is transmitted to the discard module 125. For example, a data packet with the IP address of 10.10.10.10 is processed by the no access list module 120. The no access list does not include the IP address, 10.10.10.10, or any other identifying information that matches the transmitting device or network of the data packet. Since the information associated with the data packet does not match any part of the no access list, the data packet is part or all of the first set 122 of data packets and is transmitted to the first access list module 130.

The first set of data packets is transmitted to the first access list module 130. The first access list module 130 analyzes the first set 122 of data packets using a first access list. The first access list includes, for example, a list of identifiers indicating which data packets are allowed to be transmitted to the output module 170. The list of identifiers includes identifying information associated with a high bandwidth user, identifying information associated with an important user, a field associated with the data packet, and/or meta-data associated with the data packet. The high bandwidth user is a user that transmits a large number of data packets to the output module (e.g., the average user transmits 1,000 data packets per day and the high bandwidth user transmits 100,000 data packets per day). The important user is a user that is classified as needing a higher level of service than a standard user (e.g., the standard user pays $100 per month for service and the important user pays $500 per month for a higher level of service).

A second set 132 of data packets is generated from the first set 122 of data packets that do not match the first access list. The second set 132 of data packets is transmitted to a second access list module 140. A fourth set 136 of data packets are generated from the first set 122 of data packets that do match the first access list. The fourth set 136 of data packets is transmitted to the output module 170 based on a criterion (e.g., rate limit).

In some examples, the criterion is rate control. The rate control can be a rate limit. The rate limit can be a packet rate limit (e.g., one thousand packets per minute), a byte rate limit (e.g., ten thousand bytes per second), a steady-state limit (e.g., average of ten thousand bytes per second), and/or a burst limit (e.g., a maximum of five million bytes in any one second). The rate limit is, for example, the amount of data over a set time (e.g., one hundred data packets per second, one thousand data packets per second).

The first access list module 130 generates a sixth set 134 of data packets that includes the fourth set 136 of data packets that are not transmitted to the output module 170. The sixth set 134 of data packets includes, for example, no data packets, part of the fourth set of data packets, or the entire fourth set of data packets. The fourth set 136 of data packets that are not transmitted to the output module 170 are outside of the criterion of the first access list module 130.

For example, the rate limit for the transmission of the fourth set of data packets to the output module 170 is one hundred and fifty data packets per second. The fourth set 136 of data packets is increasing in size (i.e., the first set 122 of data packets includes data packets that match the first access list) at a rate of two hundred data packets per second. The difference between the incoming packet stream of two hundred data packets per second and the rate limit of one hundred and fifty data packets causes an excess of fifty data packets per second that are not transmitted to the output module 170. This excess of fifty data packets per second makes up the sixth set 134 of data packets.

The sixth set 134 of data packets is transmitted to the attack identification module 160. The attack identification module 160 analyzes the sixth set 134 of data packets to identify network attackers. The analysis includes, for example, calculating the number of data packets received from a network address and/or network subnet, adding the number of data packets to an attack number list, and sorting the list by number of data packets to determine the network addresses and/or network subnets that have the highest number of data packets that are not being transmitted to the output module 170. For example, the sixth set 134 of data packets includes 100,000 data packets from IP subnet address 10.99.99.0. The attack identification system 160 calculates the number of data packets received from the IP subnet address 10.99.99.0. The calculated number of data packets, one hundred thousand data packets, is added to the attack number list. The attack number list is sorted by number indicating that the IP subnet address 10.99.99.0 corresponds to the highest number, 100,000 data packets, on the attack number list.

The analysis by the attack identification system 160 includes, for example, generating a no access list entry at the attack identification module 160 associated with the attack number list. The generation of the no access list entry includes, for example, the generation for the highest entry on the attack number list and/or the highest set number of entries on the attack number list (e.g., top five entries, top ten entries). The no access list entry is transmitted to the no access list module 120, and the no access list entry is added to the no access list at the no access list module 120. The no access list entry is added to the no access list to provide protection for current and/or future attacks from the network address and/or network subnet. An advantage of adding entries to the no access list through the feedback mechanism of the attack identification module 160 is that the no access list can be dynamically updated to correspond to the current risks to the system 100. The no access list entry can, for example, be added to the no access list manually (e.g., using a transmitting device to interact with an administrative module for the defense system 105).

The second set 132 of data packets is transmitted to the second access list module 140. The second access list module 140 analyzes the second set 132 of data packets using a second access list. The second access list includes, for example, a list of identifiers indicating which data packets are allowed to be transmitted to the output module 170. The list of identifiers includes identifying information associated with a low bandwidth user, identifying information associated with a standard user, a field associated with the data packet, and/or meta-data associated with the data packet. The low bandwidth user is a user that that transmits an average or approximately an average number of data packets to the output module (e.g., the average user transmits one thousand data packets per day and the low bandwidth user transmits nine hundred data packets per day). The standard user is a user that is classified as needing a regular level of service (e.g., the standard user pays $100 per month for service and the important user pays $500 per month for a higher level of service).

In some examples, the hashing generates the same bin identification and user signature for different addresses. For example, the addresses 10.5.5.5 and 10.9.9.9 are hashed to generate a bin identification and a user signature. The bin identification for both addresses is A and the user signature for both addresses is HLF342. If the address 10.5.5.5 is hashed and the user signature, HLF342, is added to the bin associated with the bin identification A, then when a data packet with the address 10.9.9.9 is processed in the second access list module 140, the data packet will match the bin identification and user signature associated with the address 10.5.5.5. Although the bin identification and user signature in the second access list module 140 are from another address, 10.5.5.5, the data packet with address 10.9.9.9 will match the bin identification and user signature. An advantage of the exemplary system 100 is the loose matching of the bin identification and user signature such that although multiple addresses can have the same bin identification and user signature, this is outweighed by the advantage of the faster matching time, lower matching cost, and reduced storage need associated with the loose matching.

The hashing can, for example, generate the same bin identification and user signature for different addresses when one address is associated with a user of the system (e.g., information associated with the user is an entry in the second access list) and the second address is not associated with a user of the system (e.g., an attacker, an illegitimate user, an unregistered user). For example, the hashed bin identification and user signature for address 10.5.5.5 are in the second access list (e.g., a user of the system). A data packet from address 10.9.9.9, not a user of the system, is hashed to generate a bin identification and a user signature. The bin identification for both addresses is A and the user signature for both addresses is HLF342. If the address 10.5.5.5 is hashed and the user signature, HLF342, is added to the bin associated with the bin identification A, then when the data packet with the address 10.9.9.9 is processed in the second access list module 140, the data packet will match the bin identification and user signature associated with the address 10.5.5.5. Although the bin identification and user signature in the second access list module 140 are from another address, 10.5.5.5, the data packet with address 10.9.9.9 will match the bin identification and user signature. Thus, a data packet not associated with a user of the system will be matched to the second access list. However, the chance of a match occurring is low (e.g., one in a billion). An advantage of the exemplary system 100 is that if an attacker (e.g., not a user of the system) generates a large number of packets using a small number of addresses, only the users in the same bin as the attacker's addresses that result in the match in signature are subject to the attack and the other users of the system will not be affected by the false match.

The second access list is, for example, an indexed plurality of lists. The indexed plurality of lists is a plurality of lists that are associated with each other by an index. An advantage of the exemplary system 100 with the indexed plurality of lists is that the second access list can include more access list entries than the first access list without a proportionately increase in access time. The second access list can, for example, be indexed using a source address, a receiver address, an ingress interface, a packet field, packet meta-data, and/or a hash thereof. For example, a single list that has 16,000 entries that takes 16,000 compares is accomplished with one thousand lists with sixteen entries on each list by seventeen compares (e.g., one compare for the index to find the correct list and sixteen compares for the entries on the list). For example, a single list that has 2,000 entries that takes 2,000 compares is accomplished with one thousand lists with an average of two entries on each list for an average of three compares (e.g., one compare for the index to find the correct list and an average of two compares for the entries on the list). The number of compares is one example and one skilled in the art will realize that well known methods of searching (e.g., list search, binary search, interpolation search, tree search, graph search) and indexing (e.g., bubble sort, binary tree sort, quick sort, bucket sort) can be implemented to improve the search and retrieval times of the system 100.

In some examples, the second access list is indexed using a field associated with the data packet, meta data associated with the data packet, a hash thereof, or combinations thereof. For example, the second access list includes IP address 10.10.10.10 and IP address 10.99.99.99. The hashed source addresses are GH1 and GH2, respectively. The second access list is indexed by the hashed source addresses. When the second access list is analyzed by the second access list module 140 to determine whether there is a match for a first data packet, the first data packet's source address, 10.10.10.10, is hashed to GH1. The hash, GH1, is compared to the index of the second access list. A match is found because the index of the second access list contains the same hash, GH1, as the first data packet, GH1, and the IP address, 10.10.10.10, of the entry matches the first data packet's source address, 10.10.10.10. Therefore, the first data packet will be allowed and it will become part or all of the fifth set of data packets which is transmitted to the output module 170 using rate control.

A third set 142 of data packets is generated from the second set 132 of data packets that do not match the second access list. The third set 142 of data packets is transmitted to a transmission module 150. A fifth set 146 of data packets are generated from the second set of data packets that do match the second access list. The fifth set 146 of data packets is transmitted to the output module 170 based on a criterion (e.g., rate limit). The second access list module 140 generates a seventh set 144 of data packets that includes the fifth set 146 of data packets that are not transmitted to the output module 170. The seventh set 144 of data packets includes, for example, no data packets, part of the fifth set 146 of data packets, or the entire fifth set of data packets. The fifth set 146 of data packets that are not transmitted to the output module 170 are outside of the criterion of the second access list module 140. The seventh set 144 of data packets is transmitted to the attack identification system 160 for analysis.

The third set 142 of data packets is transmitted to the transmission module 150. The transmission module 150 generates an eighth set 156 of data packets that the transmission module 150 transmits to the output module 170 based on the criterion (e.g., rate limit). The transmission module 150 generates a ninth set 154 of data packets that includes the eighth set 156 of data packets that are not transmitted to the output module 170. The ninth set 154 of data packets includes, for example, no data packets, part of the eighth set 156 of data packets, or the entire eighth set 156 of data packets. The eighth set 156 of data packets that are not transmitted to the output module 170 are outside of the criterion of the transmission module 150. The ninth set 154 of data packets is transmitted to the attack identification system 160 for analysis. An advantage to the exemplary system 100 is that the transmission module 150 allows packets that are not matched by the no access list, the first access list, or the second access list to be transmitted to the output module 170 based on a criterion (e.g., rate control) which prevents an attacker from reducing or stopping access to the output module 170 for other users.

In some examples, the criterion for the transmission of the data packets in the first access list module 130, the second access list module 140, and the transmission module 150 are the same (e.g., the first access list module 130, the second access list module 140, and the transmission module 150 use a rate limit of one hundred bytes per second). The criterion for the transmission of the data packets in the first access list module 130, the second access list module 140, and the transmission module 150 can, for example, each be different depending on the performance and cost constraints of each module (e.g., the first access list module 130 uses a rate limit of one thousand bytes per second, the second access list module 140 uses a rate limit of five hundred bytes per second, and the transmission module 150 uses a rate limit of one hundred bytes per second).

Figure 2:
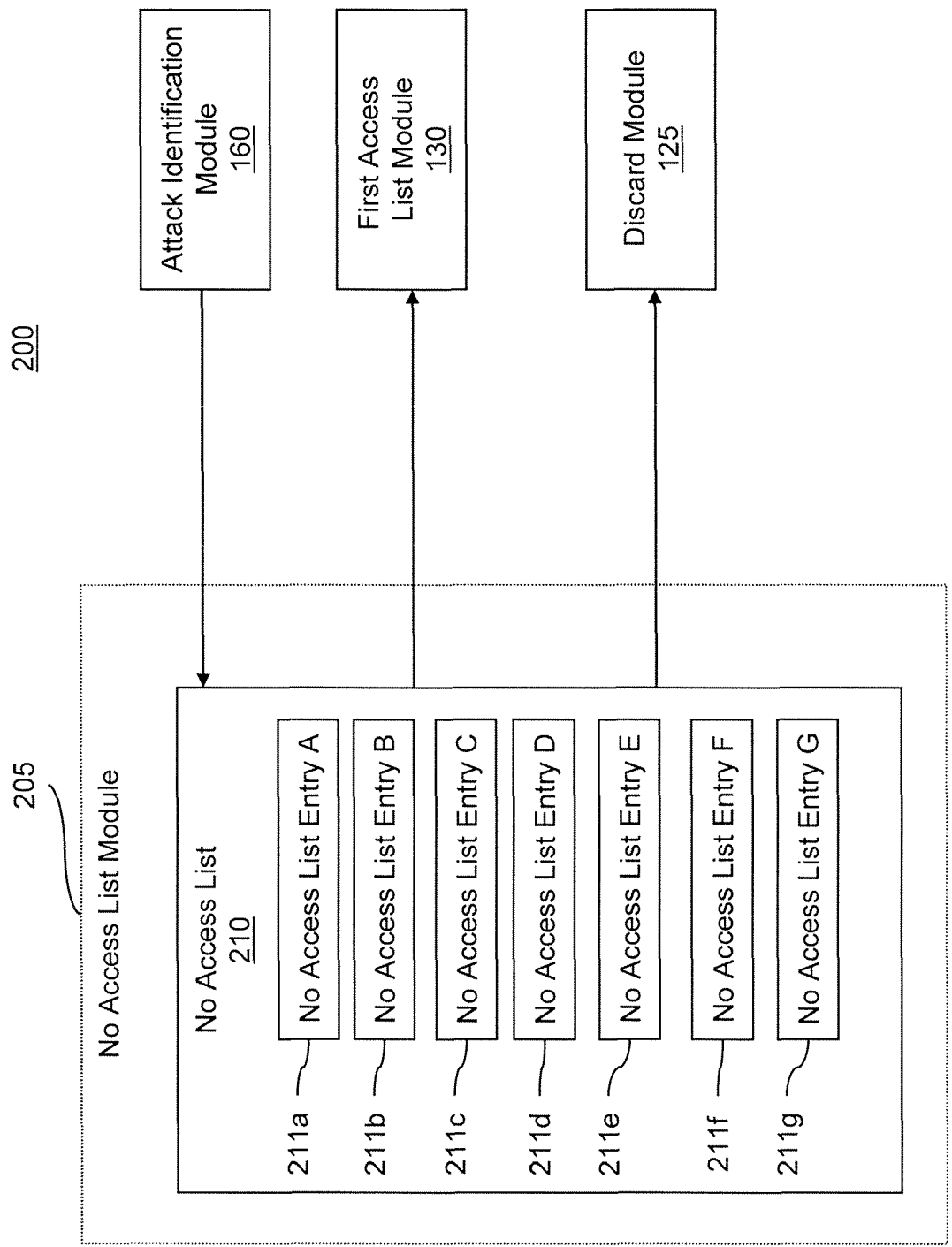
FIG. 2 is a functional block diagram of an exemplary system which filters data packets through a no access list module.

FIG. 2 is a functional block diagram of an exemplary system 200 which filters data packets through a no access list module 205. The system 200 includes the no access list module 205, the attack identification module 160, the first access list module 130, and the discard module 125. Data packets are received by the no access list module 205. The no access list module includes a no access list 210. The no access list 210 includes one or more no access list entries 211a, 211b, 211c, 211d, 211e, 211f, and 211g, generally 211. The no access list entries 211 are a list of identifiers indicating which data packets are not allowed to be transmitted to the output module 170. For example, the no access list entries 211 are illustrated as shown in Table 1.

10.98.23.2, with the no access list entries 211. The no access list entry E 211e is the network subnet of 10.98.0.0. The data packet matches the no access list entry E 211e, since the information associated with the data packet, IP address 10.98.23.2, matches as part of the network subnet in no access list entry E 211e, network subnet 10.98.0.0. The data packet with the IP address of 10.98.23.2 is transmitted to the discard module 125 where the data packet is discarded.

The no access list 210 is appended by receiving no access list entries (e.g., 211a) from the attack identification module 160. The attack identification module 160 generates no access list entries (e.g., 211a) which are transmitted to the no access list module 205 for appending to the no access list 210. For example, the attack identification module 160 classifies Network Address=10.156.199.199 as an attacker. The attack identification module 160 generates a no access list entry (e.g., 211g) from the information, network address 10.156.199.199. The no access list entry (e.g., 211g) is transmitted to the no access list module 205 which appends the no access list entry (e.g., 211g) to the no access list 210. The no access list 210 is, for example, modified by a user through an administrative module to add, delete, and/or modify no access list entries 211.

Figure 3:
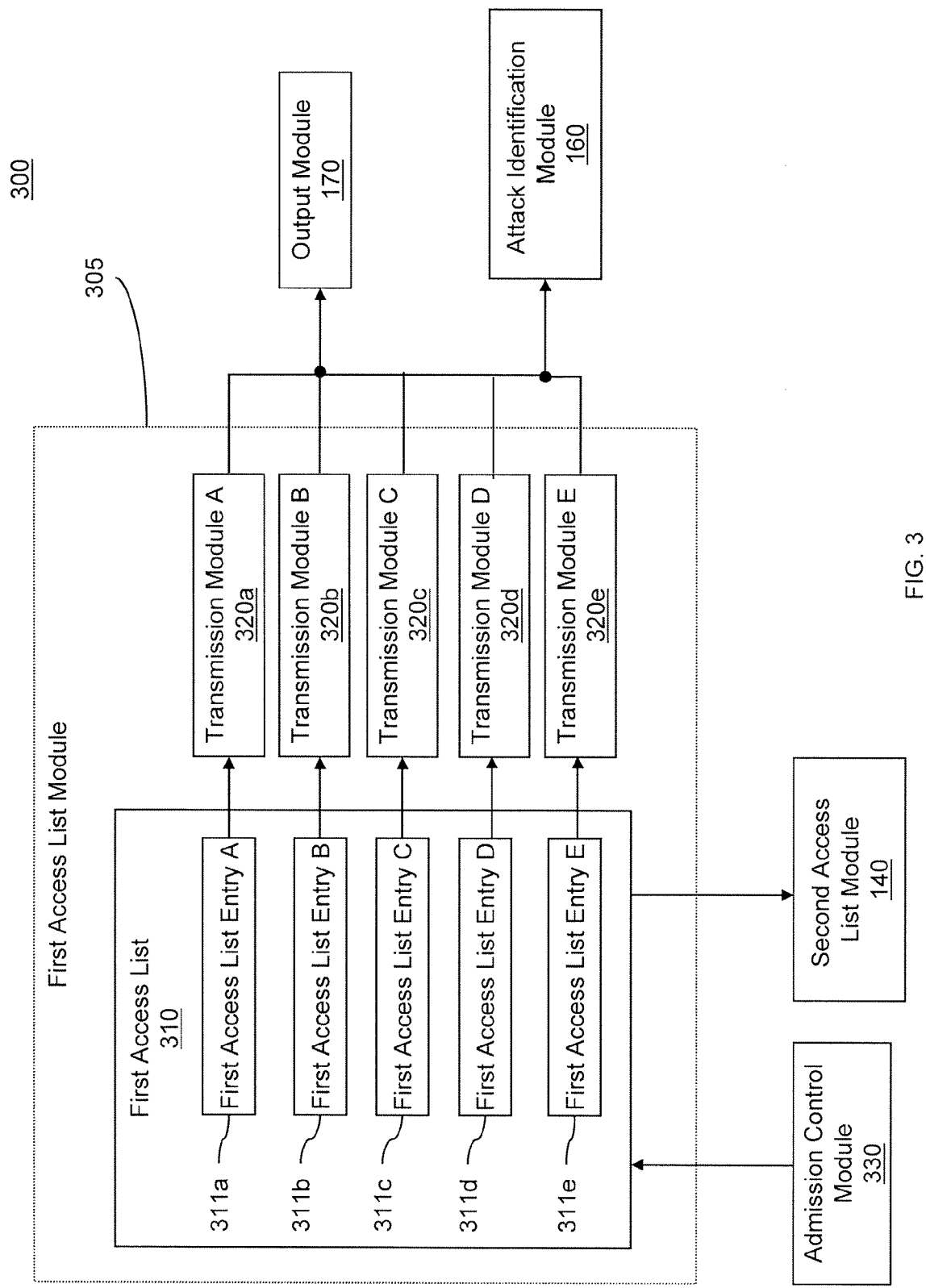
FIG. 3 is a functional block diagram of an exemplary system which filters data packets through a first access list module.

FIG. 3 is a functional block diagram of an exemplary system 300 which filters data packets through a first access list module 305. The system 300 includes a first access list module 305, transmission modules 320a, 320b, 320c, 320d, and 320e, generally 320, the attack identification module 160, the output module 170, the second access list module 140, and an admission control module 330. Data packets are received by the first access list module 305. The first access list module includes a first access list 310. The first access list includes one or more first access list entries 311a, 311b, 311c, 311d, and 311e, generally 311. The first access list entries 311 are a list of identifiers indicating which data packets are allowed to be transmitted to the output module 170. For example, the first access list entries 311 are illustrated as shown in Table 2.

TABLE 1

Example of No Access List

| Entry Number | Corresponding Number | Entry |
| --- | --- | --- |
| No Access List Entry A | 211a | Network Address = 10.99.99.99 |
| No Access List Entry B | 211b | Network Subnet = 10.99.98.0 |
| No Access List Entry C | 211c | MAC Address = 10:01:02:03:04:09 |
| No Access List Entry D | 211d | Network Address = 10.99.22.33 |
| No Access List Entry E | 211e | Network Subnet = 10.98.0.0 |
| No Access List Entry F | 211f | Network Address = 10.99.99.98 |
| No Access List Entry G | 211g | Network Address = 10.156.99.99 |

The data packets received by the no access list module 205 are analyzed using the no access list 210. If a data packet matches a no access list entry (e.g., 211a), then the data packet is transmitted to the discard module 125. If a data packet does not match a no access list entry (e.g., 211a), then the data packet is transmitted to the first access list module 130. The matching includes the comparison of part or all of the information associated with the data packet (e.g., an IP address, a MAC address, and/or a network address). For example, a data packet with the IP address of 10.98.23.2 is received by the no access list module 205. The data packet is analyzed using the no access list 210. The analysis includes comparing the information associated with the data packet, IP address 10.98.23.2, with the entries 211 in the no access list 210. The analysis compares the IP address of the data packet,

TABLE 2

Example of First Access List

| Entry Number | Corresponding Number | Entry |
| --- | --- | --- |
| First Access List Entry A | 311a | Network Address = 10.10.10.1 |
| First Access List Entry B | 311b | Network Subnet = 10.14.15.0 |
| First Access List Entry C | 311c | MAC Address = 10:01:02:03:04:01 |
| First Access List Entry D | 311d | Network Address = 10.10.11.2 |
| First Access List Entry E | 311e | Network Subnet = 10.20.34.0 |

The data packets received by the first access list module 305 are analyzed using the first access list 310. If a data packet matches a first access list entry (e.g., 311a), then the data packet is transmitted to the transmission module 320. The transmission module 320 transmits the data packet to the output module 170 based on a criterion (e.g,. rate limit).

Although the exemplary system 300 shows each first access list entry 311 connected to one transmission module 320, more than one first access list entry 311 can be connected to one transmission module 320 (e.g., first access list entry A 311a and first access list entry B 311b transmit allowed data packets to transmission module A 320a for transmission to the output module 170). In some examples, one or more of the first access list entries 311 are associated together and data packets matching the associated first access list entries 311 are transmitted to one transmission module 320. The association can, for example, be data packets from a network subnet, users associated with a customer (e.g., mobile users associated with a business customer), and/or other types of identifying associations. An advantage of the exemplary system 300 is that the data packets matching the associated first access list entries 311 are transmitted using the same criterion (e.g., rate limit) which allows for the transmission using criterion appropriate to the associated entries (e.g., for cost and performance constraints).

If the data packet is outside of the criterion (e.g., rate control is a rate limit of ten packets per second and the data packet would make the rate eleven packets per second), then the data packet is transmitted to the attack identification module 160. If a data packet does not match a first access list entry 311, then the data packet is transmitted to the second access list module 140. The matching includes the comparison of part or all of the information associated with the data packet (e.g., an IP address, a MAC address, and/or a network address).

For example, a data packet with the IP address of 10.14.15.2 is received by the first access list module 305. The data packet is analyzed using the first access list 310. The analysis includes comparing the information associated with the data packet, IP address 10.14.15.2, with the first access list entries 311 in the first access list 310. The analysis compares the IP address of the data packet, 10.14.15.2, with the first access list entries 311. The first access list entry B 311b is the network subnet of 10.14.15.0. The data packet matches the first access list entry B 311b, since the information associated with the data packet, IP address 10.14.15.2, matches as part of the network subnet in the first access list entry B 311b, network subnet 10.14.15.0. The data packet with the IP address of 10.14.15.2 is transmitted to the transmission module B 320b. The transmission module B 320b rate controls the transmission of the data packet to the output module 170. The rate control of the transmission is a rate limit of one hundred data packets per second and the rate is eighty data packets per second when the data packet is transmitted to the transmission module B 320b. Since the rate is less than the rate limit, then the data packet is transmitted by the transmission module B 320b to the output module 170. However, if the rate was greater than the rate limit, then the data packet would be transmitted by the transmission module B 320b to the attack identification module 160.

For example, a data packet with the IP address of 10.10.15.2 is received by the first access list module 305. The data packet is analyzed using the first access list 310. The analysis includes comparing the information associated with the data packet, IP address 10.10.15.2, with the entries in the first access list 310. The analysis compares the IP address of the data packet, 10.10.15.2, with the first access list entries 311. The data packet does not match any of the first access list entries 311. The data packet with the IP address of 10.10.15.2 is transmitted to the second access list module 140.

The first access list 310 is modified by receiving requests from the admission control module 330. The admission control module 330 requires a successful authentication before the stored user signatures can be modified (e.g., login and password). The modification is, for example, an addition, deletion, and/or an edit of a first access list entry. The admission control module 330 receives a request for service from a user. The admission control module 330 processes the request for service and generates a first access list entry from the information associated with the request for service. For example, the request for service is for an IP enabled telephone to communicate to the output module 170. The user associated with the IP enabled telephone is classified by the admission control module 330 as a high bandwidth user, so the admission control module 330 generates a first access list entry from the information associated with the request for service (e.g., the MAC address 10:01:05:05:05:05). The first access list entry is the MAC address for the IP enabled telephone of the high bandwidth user. The admission control module 330 transmits the first access list entry to the first access list 310 where the first access list entry is added to the first access list 310.

The admission control module 330 can, for example, process the request for service by checking the first access list entries 311 to determine if a first access list entry exists for the user. If a first access list entry exists 311 for the user, the entry can be edited or appended. For example, the request for service is for an IP enabled telephone to communicate to the output module 170. The user associated with the request for service is classified by the admission control module 330 as a high bandwidth user and upon checking the first access list 310, the admission control module 330 determines that the user already has a first access list entry 3 313. The information associated with the request for service instructs the admission control module 330 that the user is replacing the user's existing IP enabled telephone with a new IP enabled telephone associated with the information in the request for service. The admission control module 330 edits the existing first access list entry C 311c for the user to include the information associated with the request for service.

Figure 4:
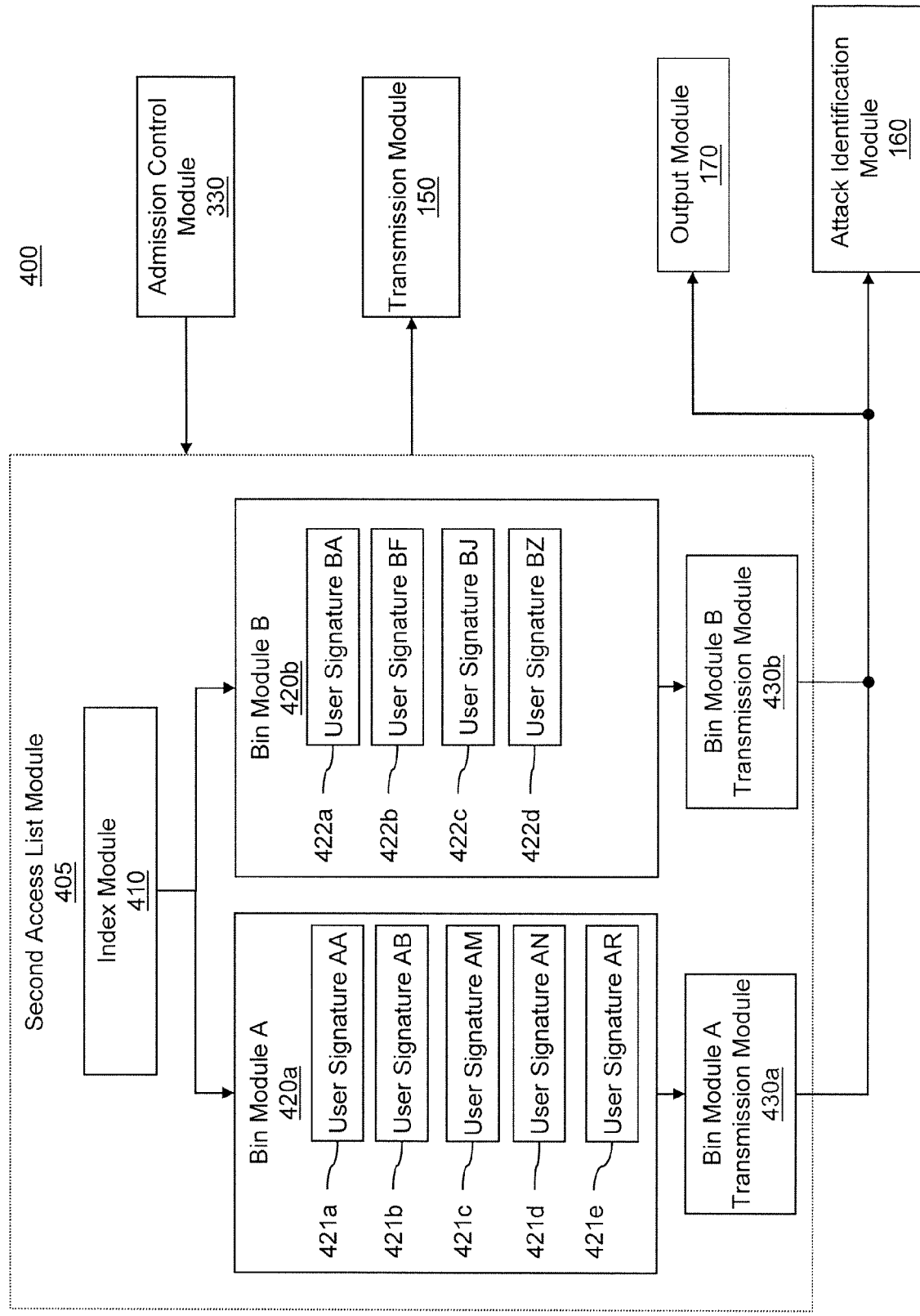
FIG. 4 is a functional block diagram of an exemplary system which filters data packets through a second access list module.

FIG. 4 is a functional block diagram of an exemplary system 400 which filters data packets through a second access list module 405. The system 400 includes a second access list module 405, a index module 410, a bin module A 420a, a bin module B 420b, a bin module A transmission module 430a, a bin module B transmission module 430b, the attack identification module 160, the output module 170, the transmission module 150, and the admission control module 330. A data packet is received by the second access list module 405. The data packet is received at the index module 410. The index module 410 hashes the data packet using a field in the data packet to generate a bin identification (e.g., A0, A1, B2, A23H, H23, B23234HFL, BC4353) and a user signature (e.g., HFLGDLSKD, BC432423523, HFG2231, ADF65, WER98). In some examples, the bin identification is the number of the bin (e.g., one, two, three, four, five). The user signature can, for example, be a uniform size for faster access (e.g., A1234, B1234, C2345, D3242, E3244).

The field in the data packet is, for example, a port number, an Ethernet virtual local area network (VLAN) tag, meta-data about the data packet, a receiver interface, an incoming logical IP address, a source IP address (e.g., 10.10.10.10), a destination IP address (e.g., 10.5.5.5), a source MAC address (e.g., 10:01:02:05:05:01), and/or a destination MAC address.

The index module 410 can, for example, hash the data packet using more than one of the fields associated with the data packet.

The bin identification is processed by the index module 410 to associate the user signature (e.g., HFLGDLSKD) to a first bin (e.g., bin module A 420a or bin module B 420b) included in a plurality of bins. Although the system 400 is shown with two bin modules 420a and 420b, other examples include any number of bin modules (e.g., three, four, ten, twenty, one hundred, one thousand, ten thousand). If the bin identification does not associate the user signature to a first bin, then the data packet associated with the bin identification is transmitted to the transmission module 150. The first bin 420a or 420b compares the user signature (e.g., HFLGDLSKD) to zero or more stored user signatures, 421a, 421b, 421c, 421d, 421e, 422a, 422b, 422c, 422d, generally 421 and 422, associated with the first bin 420a or 420b, respectively. For example, the stored user signatures 421 and 422 are illustrated as shown in Table 3.

TABLE 3

Example of Bin Identification and User Signatures

| Entry Number | Corresponding Number | Entry |
| --- | --- | --- |
| Bin Module A Identification |  | A |
| Bin Module B Identification |  | B |
| User Signature AA | 421a | HFLGDLSKD |
| User Signature AB | 421b | HFLGDLFFF |
| User Signature AM | 421c | FFF123456 |
| User Signature AN | 421d | HLKIDIDSD |
| User Signature AR | 421e | A45298AALKU |
| User Signature BA | 422a | NM |
| User Signature BF | 422b | B0222 |
| User Signature BJ | 422c | B8492A |
| User Signature BZ | 422d | B23934ab9 |

The stored user signatures 421 and 422 can, for example, be linked by memory addresses with the first bin, be logically stored in memory associated with the first bin and/or other variations of computer readable storage devices. In some examples, the size of the user signatures is variable depending on the goal of the exemplary system 400. The goal of the exemplary system 400 can, for example, be detailed filtering (e.g., require an exact match for every data packet allowed, requires smaller chance of false match) which would require a larger user signature (e.g., HAFADAWEC23142) or loose filtering (e.g., require a match for only a percentage of data packets associated with the first bin, signature storage is limited and speed of match is important) which would require a smaller user signature (e.g., HFA1). The loose filtering can, for example, be used when the number of users stored in the second access list module 405 increases by decreasing the size of one or more of the stored user signatures 421 and 422. The decrease in size can enable the bin modules 420a and 420b to process data packets faster and with a lower memory cost per signature. A tradeoff to faster processing and reduced memory usage is that the smaller user signature (e.g., 422a) causes more false matches (e.g., user signature associated with a data packet matches a stored user signature 421 and 422 when the data packet is not associated with a user of the system) than a larger user signature (e.g., 421e). An advantage of the exemplary system 400 is that the size of the user signatures can be changed according to the cost and performance needs of the system 400.

If the user signature does not match one of the stored user signatures 421 or 422 then the data packet is transmitted to the transmission module 150. If the user signature matches one of the stored user signatures, 421 or 422, then the data packet is transmitted to the first bin transmission module 430a or 430b, respectively.

Although the exemplary system 400 shows each bin module 420a and 420b connected to one transmission module 430a and 430b, respectively, more than one bin module 420a and 420b can, for example, be connected to one transmission module 430a or 430b (e.g., bin module A 420a and bin module B 420b transmit allowed data packets to bin module A transmission module A 430a for transmission to the output module 170). In some examples, each stored user signature 421 and 422 is connected to one transmission module 430a or 430b (e.g., user signature AA 421a, user signature AB 421b, and user signature AC 421c are each connected to an individual transmission module 430a or 430b). In some examples, one or more of the stored user signatures 421 and 422 are associated together and data packets matching the associated stored user signatures 421 and 422 are transmitted to one transmission module 430. The association can, for example, be data packets from a network subnet, users associated with a customer (e.g., mobile users associated with a business customer), and/or other types of identifying associations. An advantage of the exemplary system 400 is that the data packets matching the associated stored user signatures 421 and 422 are transmitted using the same criterion (e.g., rate limit) which allows for the transmission using criterion appropriate to the associated user signatures (e.g., for cost and performance constraints).

The first bin transmission module 430a or 430b transmits the data packet to the output module 170 based on a criterion (e.g., rate limit). If the data packet is transmitted to the first bin transmission module 430a or 430b, but is not transmitted to the output module 170 because of the criterion, then the data packet is transmitted to the attack identification module 160.

For example, a data packet is received by the index module 410. The data packet has the IP address of 10.10.5.5. The index module 410 hashes the data packet to generate a bin identification of A and a user signature of FFF123456. The index module 410 processes the bin identification of A to associate the user signature FFF123456 to bin module A 420a. The bin module A 420a compares the user signature FFF123456 to the zero or more stored user signatures 421 associated with bin module A 420a. The user signature FFF123456 matches a user signature AM 421c associated with the bin module A 420a. The data packet associated with the matched user signature FFF123456 is transmitted to the bin module A transmission module 430a. The bin module A transmission module 430a transmits the data packet to the output module based on a criterion (e.g., rate limit). The criterion is rate control and the rate control is a rate limit of one thousand packets per second. The rate of the bin module A transmission module 430a is nine hundred packets per second when the data packet is received by the bin module A transmission module. Since the rate of the bin module A transmission module 430a is less then the rate limit, then the data packet is transmitted to the output module 170.

The bin modules 420a and 420b are modified by receiving requests from the admission control module 330. The modification is, for example, an addition, deletion, and/or an edit of a user signature. The admission control module 330 receives a request for service from the input module 110. The admission control module 330 processes the request for service and generates a bin identification and a user signature from the information associated with the request for service. For example, the request for service is for an IP enabled telephone to communicate to the output module 170. The user associated with the IP enabled telephone is classified by the admission control module 330 as a standard user, so the admission control module 330 generates a bin identification and a user signature from the information associated with the request for service (e.g., the MAC address 10:01:05:05:05:05). The admission control module 330 transmits the bin identification and the user signature to the index module 410. The index module 410 processes the bin identification to associate the user signature with a bin 420a or 420b. The user signature is transmitted to the matched bin 420a or 420b. The user signature is added to the matched bin 420a or 420b.

In some examples, the number of user signatures (e.g., 421a) exceeds the capacity of a bin module 420a and 420b. The capacity of a bin module 420a and 420b is a preset size limit or a size limit in relationship to the available memory (e.g., volatile and/or non-volatile) in the system 400. When the number of user signatures 421 and 422 exceeds the capacity of the bin module 420a and 420b, then the data packets associated the with the over capacity bin module 420a or 420b are transmitted to the bin module transmission module 430a or 430b without comparing the user signature of the data packet. An advantage of the exemplary system 400 is that when the bin module 420a and 420b is filled past the designed capacity, then the system will not stop transmitting data packets (i.e., fail) but will provide a graceful degradation of performance.

An advantage to the exemplary system 400 is that the an increased number of data packets can be processed over a single list system because of the distribution of the matching of the entries into a plurality of bin modules. Another advantage of the exemplary system 400 is that even if an attacker is matched in one of the bin modules, then the other bin modules will not be affected by the increase in traffic in the matched bin module since the matched bin module will rate control the output of the data packets. Another advantage of the exemplary system 400 is that each bin module (e.g., 420a) can contain thousands of user signatures (e.g., 421a). Another advantage of the exemplary system 400 is that by allowing false matching, the system 400 can store and match signatures rather than the exact addresses of the users thereby achieving better scalability with respect to the number of users as storage needs are reduced and match speed is increased. Another advantage of the exemplary system 400 is that by allowing false matching, the system 400 has a more efficient way of handling of bins exceeding their capacity by not matching signatures in those bins.

Figure 5:
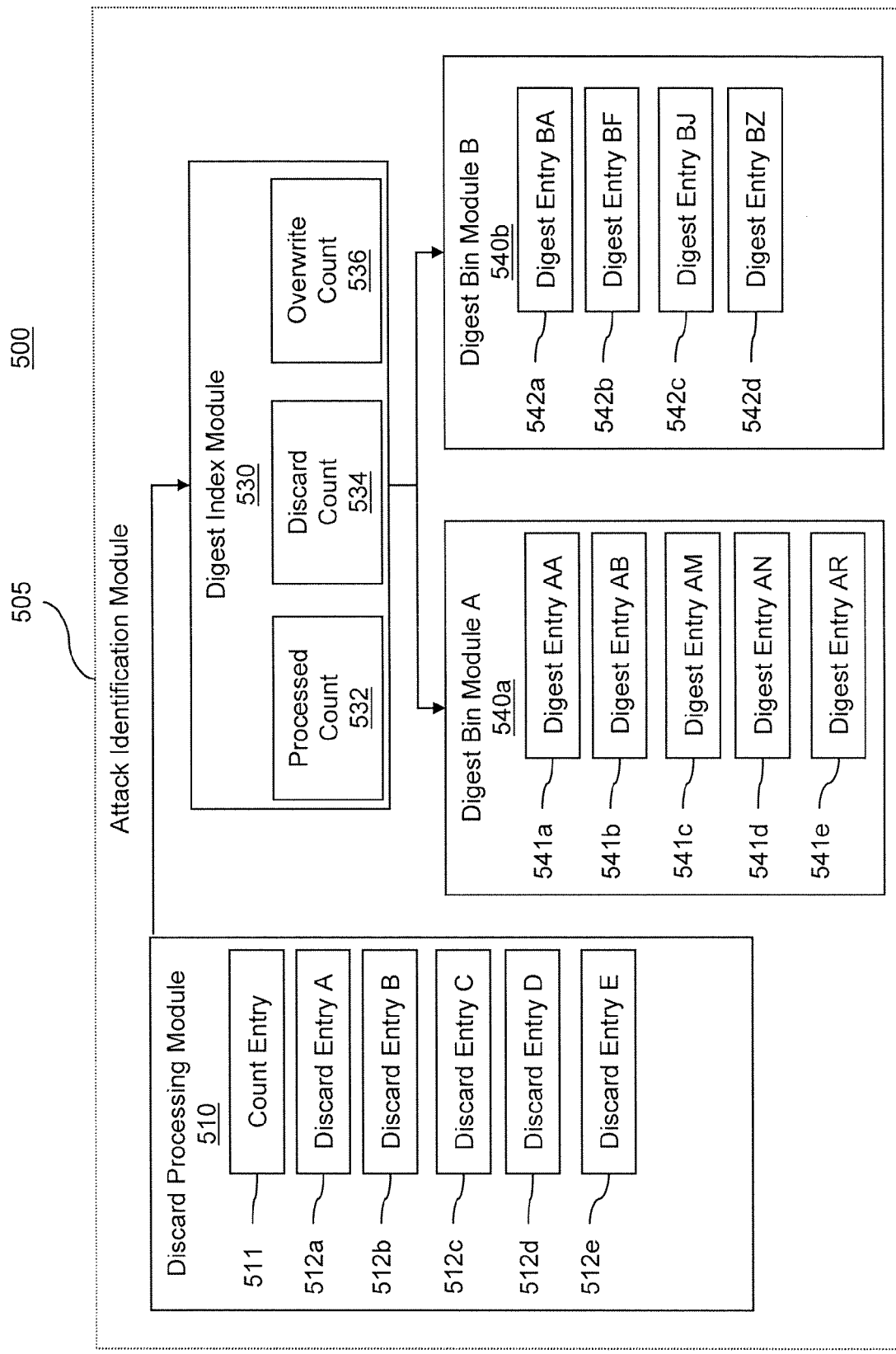
FIG. 5 is a functional block diagram of an exemplary system which process data packets to identify attacks.

FIG. 5 is a functional block diagram of an exemplary system 500 which process data packets to detect attacks. The exemplary system 500 includes an attack identification module 505. The attack identification module 505 includes a discard processing module 510, a digest index module 530, a digest bin module A 540a, and a digest bin module B 540b. A data packet is received at the discard processing module 510. The discard processing module 510 generates a discard entry (e.g., 512a) for the data packet. The discard processing module 510 can, for example, be a ring buffer, a queue, a first in first out queue, and/or a first in last out queue. The discard entry (e.g., 512a) includes identifying information associated with the data packet such as the network address, the network subnet address, the IP address, the MAC address, a networking protocol header field, meta-data associated with the data packet, an arrival interface, a destination interface, and/or an origination interface,. A count entry 511 (e.g., ten, twenty, one thousand) is incremented (e.g., adding one to the count) for the data packet. The count entry 511 can, for example, be used by the attack identification module 505 to identify when data packets are received by the discard processing module 510, but are not processed into a discard entry 512. For example, the difference between the count entry 511 and the number of discard entries 512 allows the attack identification module 505 to monitor if the discard processing module 510 is able to process at the rate of the incoming data packets. The discard processing module 510 is full when, for example, the discard processing module 510 cannot accept any more discard entries because of a discard entry limit and/or a storage capacity limit. For example, the discard entries 512a, 512b, 512c, 512d, and 512e, generally 512, are illustrated as shown in Table 4.

TABLE 4

Example of Discard Entry

| Entry Number | Corresponding Number | Entry |
|---|---|---|
| Discard Entry A | 512a | Network Address = 10.10.10.1; MAC Address = 10:01:09:AE:1A:05 |
| Discard Entry B | 512b | Network Address = 10.10.10.5; MAC Address = 10:01:09:22:1A:05 |
| Discard Entry C | 512c | Network Address = 10.10.8.9; MAC Address = 10:01:09:AE:33:05 |
| Discard Entry D | 512d | Network Address = 10.9.23.2; MAC Address = 10:01:09:AE:1A:11 |
| Discard Entry E | 512e | Network Address = 10.45.35.23; MAC Address = 10:22:09:44:1A:05 |

The discard entry (e.g., 512a) is received at the digest index module 530. The discard entries 512 are, for example, transmitted to the digest index module 530 in the order that the discard entries 512 are added to the discard processing module 510 with the oldest entry being processed first (i.e., first in first out (FIFO) queue). In some examples, the discard entries 512 are transmitted to the digest index module 530 in the order that the discard entries 512 are added to the discard processing module 510 with the newest entry being processed first (i.e., first in last out (LIFO) queue).

The digest index module 530 hashes the discard entry (e.g., 512a) using one or more fields in the discard entry (e.g., 512a) to generate a bin identification and a user signature. The bin identification is processed to associate the user signature with a first digest bin module 540a or 540b included in a plurality of digest bin modules. The discard entry (e.g., 512a) is processed at the first digest bin module 540a or 540b. In some examples, the digest index module 530 hashes one or more fields in the discard entry (e.g., 512a) to generate a bin identification and hashes one or more different fields in the discard entry (e.g., 512a) to generate a user signature. The processing of the discard entry (e.g., 512a) by the digest index module 530 increments (e.g., one) a processed count 532 (e.g., ten thousand).

The processing of the discard entry (e.g., 512a) at the first digest bin module 540a or 540b includes comparing the user signature of the discard entry (e.g., 512a) to one or more stored user signatures associated with the digest entries 541a, 541b, 541c, 541d, 541e, 542a, 542b, 542c, and 542d, generally 541 and 542, associated with the first digest bin module 540a or 540b. If the discard entry (e.g., 512a) matches a stored user signature associated with the digest entries 541 or 542, then a hit counter (see e.g., Table 5 below) is incremented (e.g., by one) on a first digest entry (e.g., 541a) associated with the matched user signature.

If the discard entry (e.g., 512a) does not match one of the stored user signatures associated with the digest entries (e.g., 541a) associated with the first digest bin module 540a or 540b, then the discard entry (e.g., 512a) is processed into a digest entry (e.g., 541a) and the new digest entry is added to the first digest bin module 540a or 540b. The digest entry (e.g., 541a) includes, for example, identifying information associated with the data packet (e.g., protocol), a timestamp, a user signature, a hit counter, a packet field, and/or an uniqueness indicator. The packet field can be the source IP address, the destination IP address, the MAC address, logical address, a virtual local area network (VLAN) tag, interface address, and/or other identifying packet fields. The uniqueness indicator includes, for example, a value indicating the relative uniqueness of the fields associated with the data packets in the hit count of the digest entry (e.g., 541a). For example, the digest entries 541 and 542 are illustrated in Table 5.

In some examples, the uniqueness indicator is incremented by matches of select fields associated with the data packets in the hit count of the digest entry (e.g., 541a). The uniqueness indicator is, for example, matching the first three digits of the network address (e.g., 10.10.10.x). For example, if data packets with the network addresses of 10.10.10.1, 10.10.10.2, and 10.10.10.33 were received, then the hit count is three, but the uniqueness indicator is zero since the first three digits of the second and third data packets are the same as the first three digits of the first data packet. An advantage of the exemplary system 500 is that the difference between the hit count and the uniqueness indicator indicates whether the initial network address that is stored in the digest entry (e.g., 541a) accounts for the hits. For example, if the hit count is one thousand and the uniqueness indicator is two, then the initial network address accounted for most of the hits. However, if the hit count is one thousand and the uniqueness indicator is nine hundred, then the initial network address did not account for most of the hits.

The digest bin module 540a or 540b can, for example, fill to capacity (e.g., a preset limit or a memory limitation). When the digest bin module 540a or 540b fills to capacity, the timestamps of each digest entry 541 or 542 in the digest bin module 540a or 540b, respectively, are processed to determine the age (e.g., calculated from the timestamp) and the hit count of each digest entry 541 or 542 and to sort the digest entries 541 or 542 to determine the oldest digest entry 541 or 542 with the least number of hits. The oldest digest entry 541 or 542 with the least number of hits is deleted from the digest bin module 540a or 540b and a digest bin count entry 511 is incremented. The deletion of an old digest entry 541 or 542 increments (e.g., one) the overwrite count 536 (e.g., five hundred) stored in the digest index module 530. The deletion of an existing digest entry 541 or 542 allows for additional discard entries 512 to be processed and added to the digest bin module 540a or 540b.

In some examples, a minimum age (e.g., half of one second, one second, five seconds, sixty seconds, ten days, ten hours) is established for the digest entry 541 or 542 so that the digest entry 541 or 542 will not be deleted if it is below the minimum age. In other examples, a maximum hit count (e.g., twenty thousand, one thousand) is established for the digest entry 541 or 542 so that the digest entry 541 or 542 will not be deleted if the hit count is above the maximum hit count. If the digest entry 541 or 542 can not be added to the digest bin module 540a or 540b, because the digest bin module 540a or 540b is full to capacity and none of the digest entries 541 or 542, respectively, have not exceeded the minimum age and/or have exceeded the maximum hit count, then the discard count 534 (e.g., one hundred) is incremented (e.g., one).

An advantage of the exemplary system 500 allowing the deletion of digest entries 541 and 542 is that the attack identification module 505 can continue receiving data packets even after the digest bin modules 540a and 540b exceed their capacity. Another advantage of the exemplary system 500 checking the age and hit count of a digest entry 541 or 542 before deletion is that is prevents the constant replacement of entries because the bin fills quickly and never keeps a digest entry 541 or 542 long enough to allow the hit rate to increase. The processed count 532, the discard count 534, and the overwrite count 536 can, for example, be used to identify the number of entries in the digest index module 530, how the entries are being handled (e.g., added, deleted) by the digest index module 530, and to determine the severity of the attacks by analyzing changes in the counts 532, 534, and 536. The discard count 534 can, for example, be processed to determine if the system 500 is under attack and indicates whether the attack is from a few (e.g., hundred) attackers. The overwrite count 536 can, for example, be processed to determine if the system 500 is under attack and indicates whether the attack is from numerous (e.g., five thousand) attackers.

In some examples, the processing of the discard entry 512 at the first digest bin module 540a or 540b includes comparing one or more fields associated with the discard entry 512 to one or more stored packet fields associated with the digest entries 541 or 542 associated with the first digest bin module 540a or 540b, respectively. For example, the discard entry A 512a is from the network address 10.10.10.1. The network address 10.10.10.1 is hashed to generate a bin identification of A. The bin identification is associated with digest bin module 540a. The network address 10.10.10.1 is compared to the stored packet fields associated with the digest entries 541. The network address 10.10.10.1 of the discard entry A 512a matches the network address of digest entry AA 541a. The hit counter associated with the digest entry AA 541a is incremented by one to account for the matched network address of the discard entry A 512a.

TABLE 5

Example of Digest Entries

| Entry Number | Corresponding Number | User Signature | Timestamp | Hit Counter | Packet Field | Uniqueness Indicator |
|---|---|---|---|---|---|---|
| Digest Entry AA | 541a | 1FAL | 2006-10-30 10:45 | 2 | Network Address = 10.10.10.1 | 1 |
| Digest Entry AB | 541b | 3WAY | 2006-10-30 07:33 | 101 | Network Address = 10.10.6.5 | 11 |
| Digest Entry AM | 541c | 4DSF | 2006-10-22 18:32 | 10,243 | Network Address = 192.168.2.3 | 99 |
| Digest Entry AN | 541d | A53423 | 2006-09-21 01:22 | 23 | Network Address = 10.9.23.2 | 100 |
| Digest Entry AR | 541e | A2349A | 2006-04-13 20:33 | 103,234 | Network Address = 10.45.11.23 | 43 |

TABLE 5-continued

Example of Digest Entries

| Entry Number | Corresponding Number | User Signature | Timestamp | Hit Counter | Packet Field | Uniqueness Indicator |
|---|---|---|---|---|---|---|
| Digest Entry BA | 542a | B23952A | 2006-06-01 22:33 | 11,252 | Network Address = 10.45.12.23 | 23423 |
| Digest Entry BF | 542b | B52D | 2006-10-30 01:33 | 4,532,135 | Network Address = 10.45.13.23 | 12 |
| Digest Entry BJ | 542c | 1k3235 | 2006-10-30 03:24 | 52,232 | Network Address = 10.45.14.23 | 90 |
| Digest Entry BZ | 542d | B952FF | 2006-10-30 04:42 | 853 | Network Subnet = 10.45.13.0 | 10 |

The attack identification module 505 can, for example, include a discard processing module 510, digest index module 530, and digest bin modules 540a and 540b and the associated entries with each for the first access list module 130, the second access list module 140, and the transmission module 150. Other variations of the internal workings of the attack identification module 505 can be made depending on the needs for the identification of attackers on the system 500.

In some examples, the discard processing module 510 is connected to a plurality of digest index modules 530. Each digest index module 530 analyzes a different field and/or set of fields of the discard entries 512. An advantage to this exemplary system 500 with multiple digest index modules 530 associated with each discard processing module 510 is that multiple perspectives of the same activity can be analyzed to detect an attack.

In some examples, the attack identification module 505 processes each digest entry 541 and 542 in the plurality of bin modules 540a and 540b to generate a report of processed information. The report can, for example, be for transmission to a system operator and/or displaying on a display device. The report includes processed information on a network address, a source address, a destination address, a network interface, a port, a source port, a destination port and/or other identifying information stored in the digest entries 541 and 542.

The attack identification module 505 can, for example, process the timestamp and the hit counter of each digest entry (e.g., 541a) in the plurality of bins. The timestamp includes two or more time entries. A hit rate list is generated by the attack identification module 505. The hit rate list can, for example, include an entry for each digest entry (e.g., 541a). For example, the entry includes the hit counter divided by the difference in time between the current timestamp and the timestamp in each digest entry (e.g., 541a). The hit rate list can be used to identify how many packets are received over a given period of time.

In some examples, the attack identification module 505 processes the hit counters and timestamps of each digest entry 541 and 542 in the plurality of digest bin modules 540a and 540b to generate a high rate list. The high rate list includes the value of the hit counter divided by the difference between the newest timestamp and the oldest timestamp in each digest entry 541 and 542. The hit rate list is sorted by the rate. The hit rate list can, for example, be used to generate a report for a system operator (e.g., operator of the output module 170) and/or the report can be displayed to a display device. The hit rate list can, for example, be used by the attack identification module 505 to generate a no access list entry (e.g., 211a). The no access list entry (e.g., 211a) is received at the no access list module 205. The no access list module 205 adds the generated no access list entry to the no access list 210.

For example, the attack identification module 505 processes the hit counter and timestamp of each digest entry 541 and 542 to generate a high rate list. The high rate list is sorted as illustrated in Table 6. The top entry, digest entry BF 542b, is used to generate a no access list entry (e.g., 211a). The no access list entry includes the network address, 10.45.13.23, of the top entry. The no access list entry is received at the no access list module 205 and added to the no access list 210. The top five entries 542b, 541e, 542c, 542a, and 541c in the hit rate list can, for example, be used to generate no access list entries (e.g., 211a). Other variations of the number of top entries can, for example, be used to generate no access list entries (e.g., 211a).

TABLE 6

Example of Sorted High Rate List

| Entry Number | Corresponding Number | Rate (per second) |
|---|---|---|
| Digest Entry BF | 542b | 4,532,135 |
| Digest Entry AR | 541e | 103,234 |
| Digest Entry BJ | 542c | 52,232 |
| Digest Entry BA | 542a | 11,252 |
| Digest Entry AM | 541c | 10,243 |
| Digest Entry BZ | 542d | 853 |
| Digest Entry AB | 541b | 101 |
| Digest Entry AN | 541d | 23 |
| Digest Entry AA | 541a | 2 |

Figure 6A:
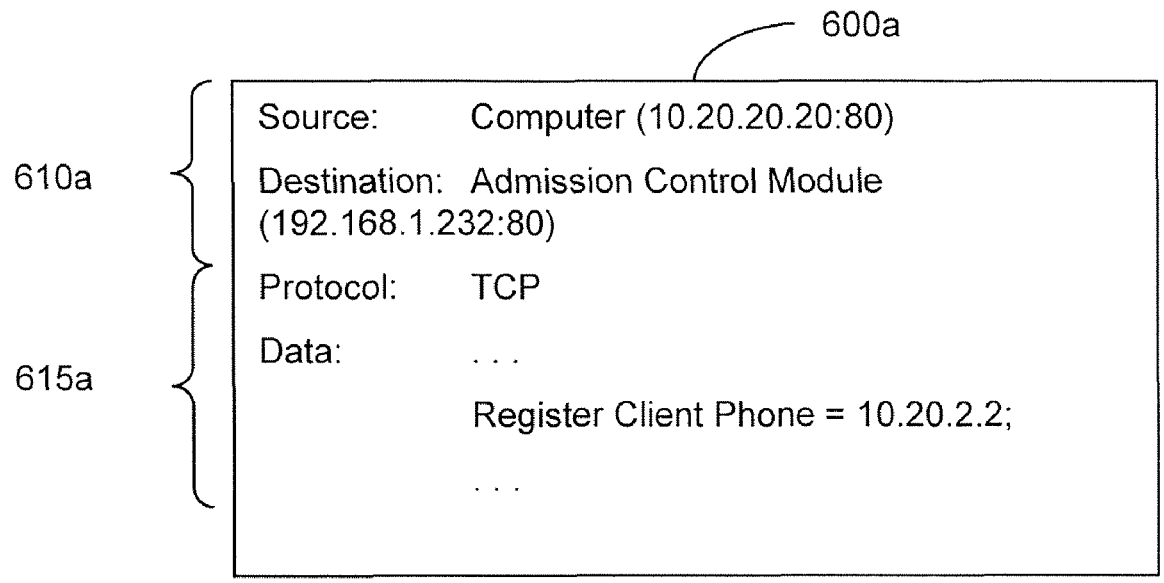
FIG. 6A is a diagram of a data packet sent from a computer.

FIG. 6A is a diagram of a data packet 600a sent from a computer. The parameters 610a define how the data packet is routed and/or processed. The parameters 610a include the source address, the destination address, the routing information, the protocol, and/or other types of data packet parameters. The data 615a includes formatting data, content data, transaction data, and/or other types of data. The content data includes client registration data. The transaction data includes connection information to modules, open phone requests, open short message service (SMS) requests, session initiation protocol (SIP) requests, send requests, close requests, and/or other types of transaction requests.

Figure 6B:
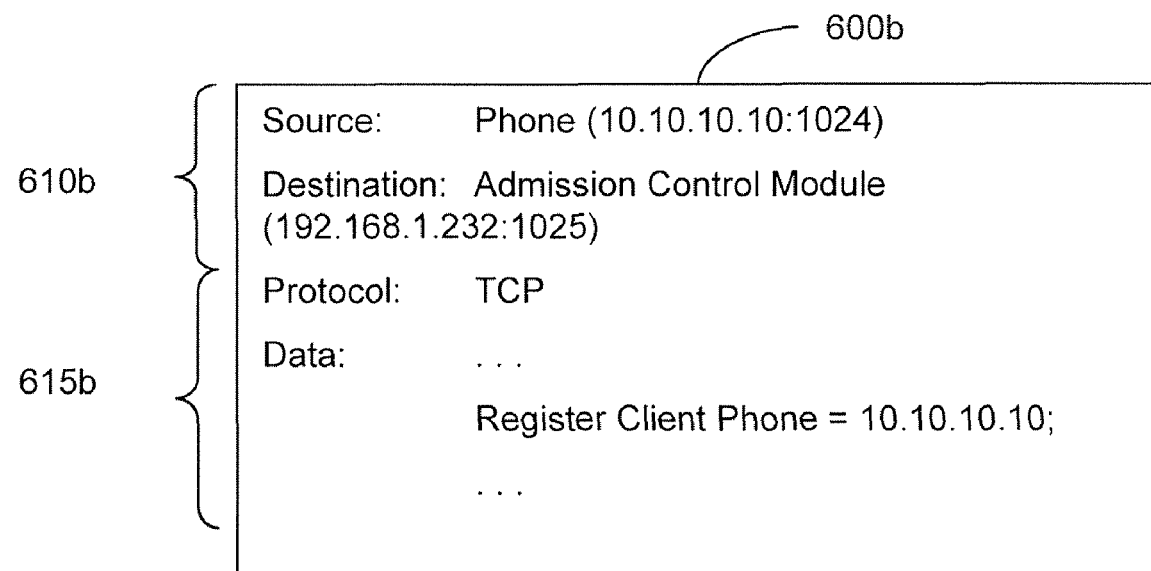
FIG. 6B is a diagram of a data packet sent from a phone.

FIG. 6B is a diagram of a data packet 600b sent from a phone. The parameters 610b define how the data packet is routed and/or processed. The parameters 610b include the source address, the destination address, the routing information, the protocol, and/or other types of data packet parameters. The data 615b includes formatting data, content data, transaction data, and/or other types of data. The content data includes client registration data. The transaction data includes connection information to modules, open phone requests, open short message service (SMS) requests, send requests, close requests, and/or other types of transaction requests.

Figure 6C:
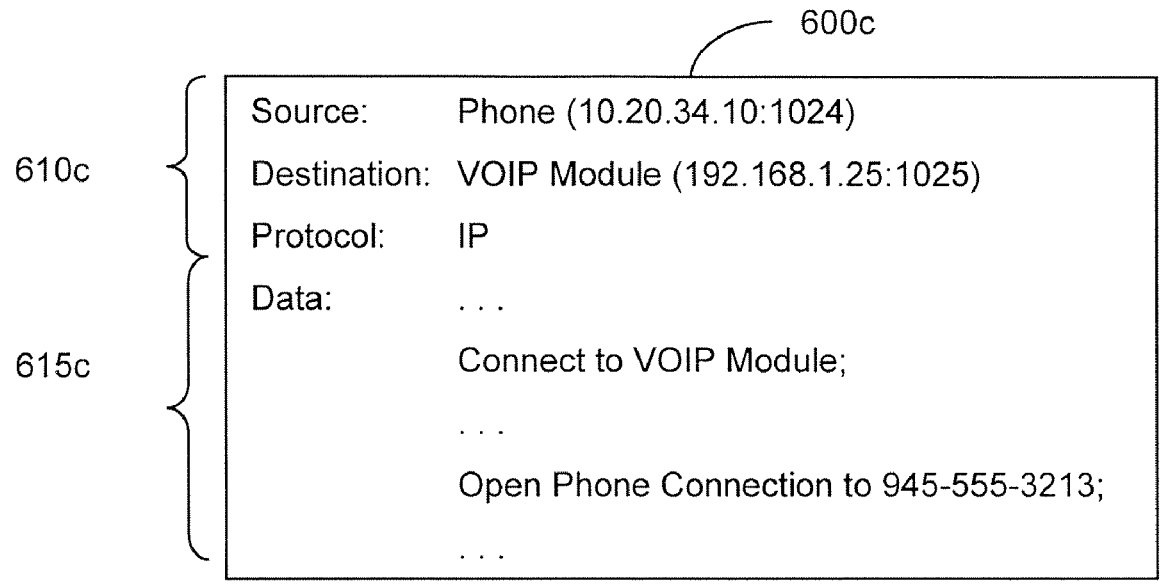
FIG. 6C is a diagram of a data packet sent from a phone.

FIG. 6C is a diagram of a data packet 600c sent from a phone. The parameters 610c define how the data packet is routed and/or processed. The parameters 610c include the source address, the destination address, the routing information, the protocol, and/or other types of data packet parameters. The data 615c includes formatting data, content data, transaction data, and/or other types of data. The content data includes client registration data. The transaction data includes connection information to modules, open phone requests, open short message service (SMS) requests, send requests, close requests, and/or other types of transaction requests.

Figure 6D:
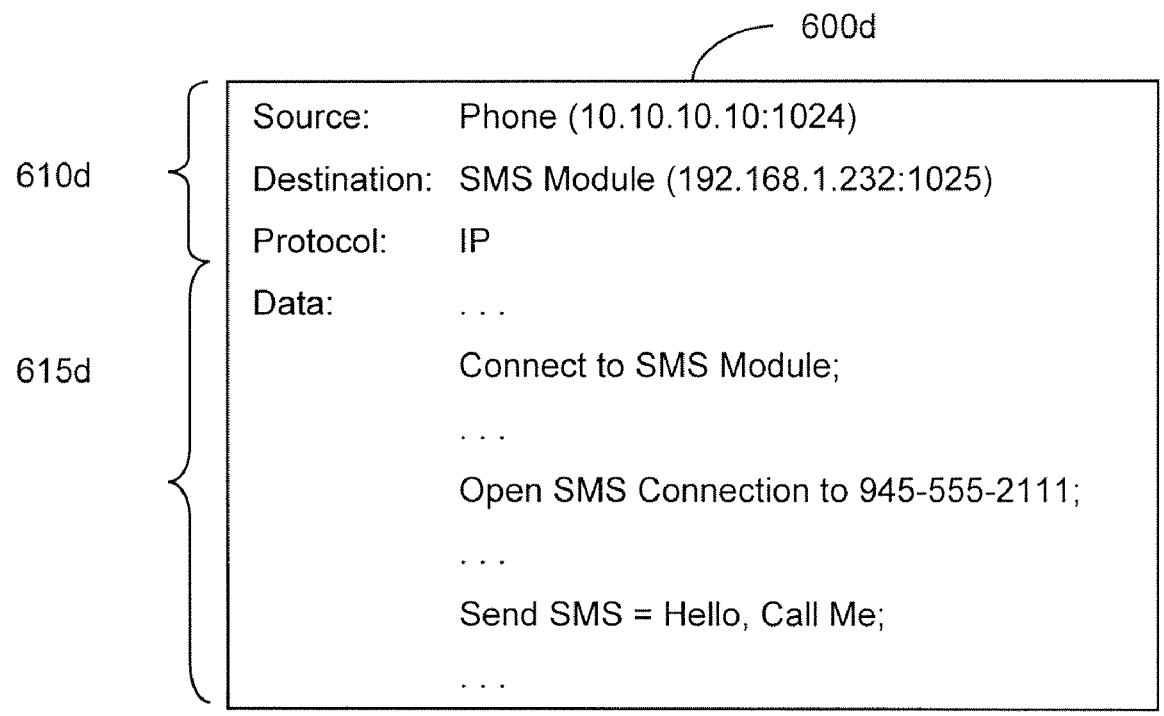
FIG. 6D is a diagram of a data packet sent from a phone.

FIG. 6D is a diagram of a data packet 600d sent from a phone. The parameters 610d define how the data packet is routed and/or processed. The parameters 610d include the source address, the destination address, the routing information, the protocol, and/or other types of data packet parameters. The data 615d includes formatting data, content data, transaction data, and/or other types of data. The content data includes client registration data. The transaction data includes connection information to modules, open phone requests, open short message service (SMS) requests, send requests, close requests, and/or other types of transaction requests.

Figure 6E:
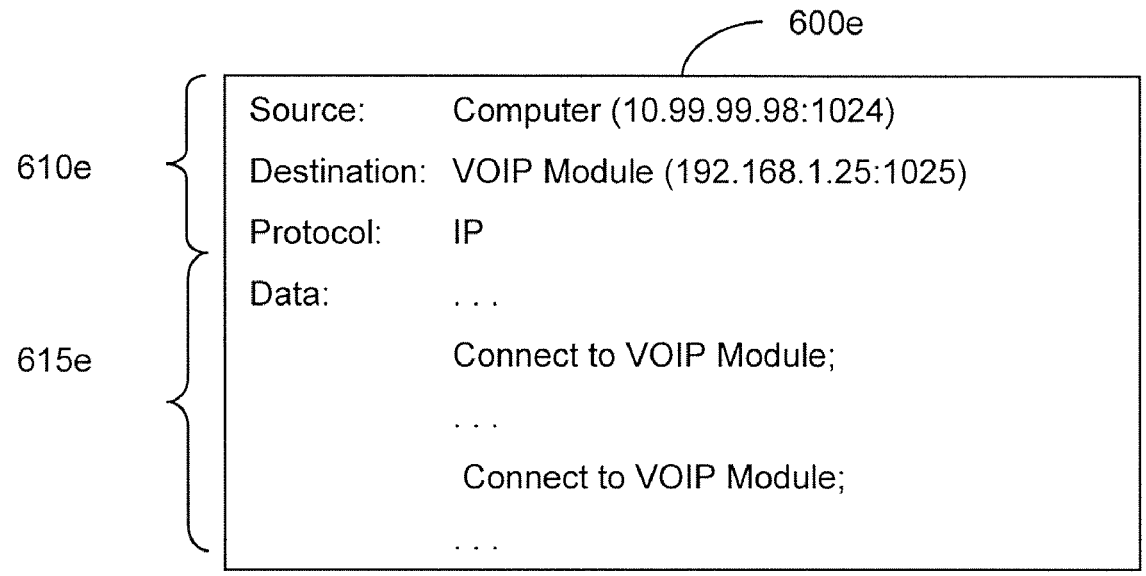
FIG. 6E is a diagram of a data packet sent from a phone.

FIG. 6E is a diagram of a data packet 600e sent from a phone. The parameters 610e define how the data packet is routed and/or processed. The parameters 610e include the source address, the destination address, the routing information, the protocol, and/or other types of data packet parameters. The data 615e includes formatting data, content data, transaction data, and/or other types of data. The content data includes client registration data. The transaction data includes connection information to modules, open phone requests, open short message service (SMS) requests, send requests, close requests, and/or other types of transaction requests.

Figure 6F:
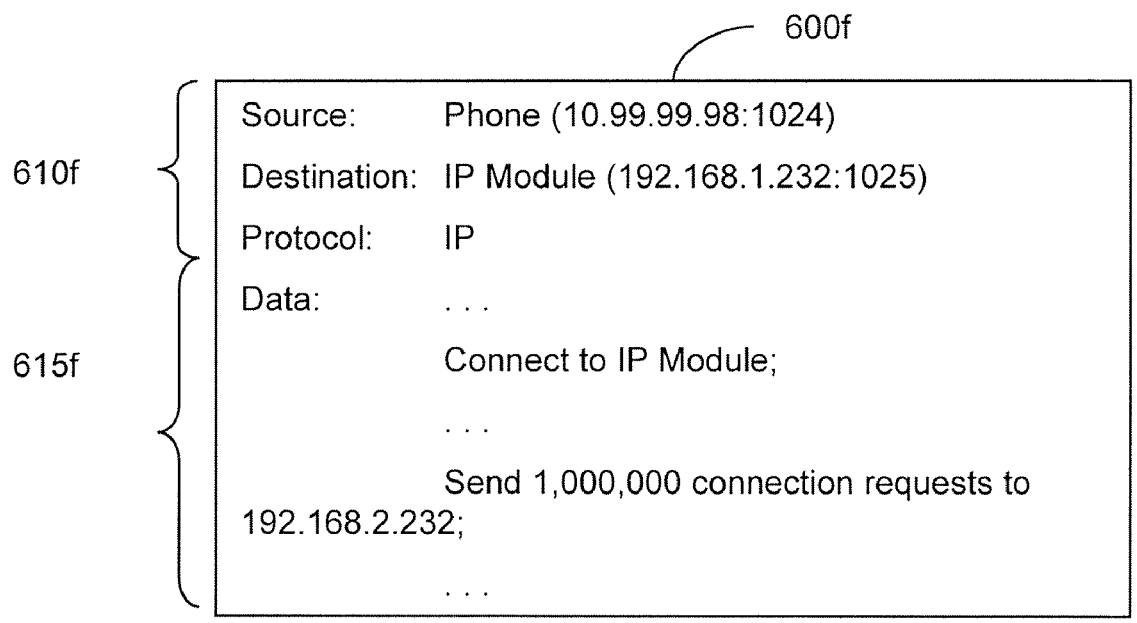
FIG. 6F is a diagram of a data packet sent from a phone.

FIG. 6F is a diagram of a data packet 600f sent from a phone. The parameters 610f define how the data packet is routed and/or processed. The parameters 610f include the source address, the destination address, the routing information, the protocol, and/or other types of data packet parameters. The data 615f includes formatting data, content data, transaction data, and/or other types of data. The content data includes client registration data. The transaction data includes connection information to modules, open phone requests, open short message service (SMS) requests, send requests, close requests, and/or other types of transaction requests. The data packets 600a, 600b, 600c, 600d, 600e, and 600f depict the data packets transmitted to the exemplary system 100 of FIG. 1. from the input module 110.

Figure 7A:
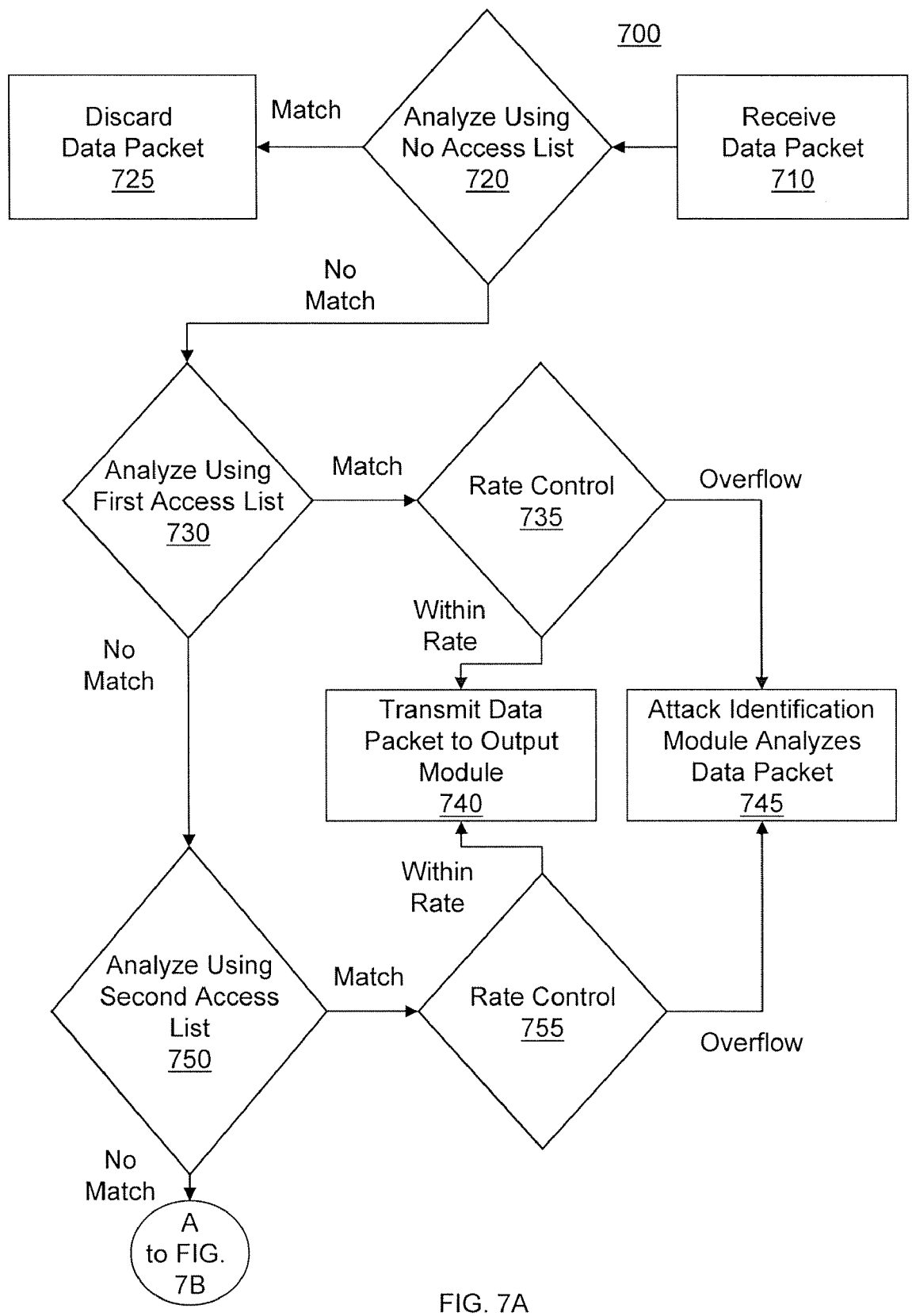
FIGS. 7A and 7B are a flowchart depicting the processing of a data packet through an exemplary system.
Figure 7B:
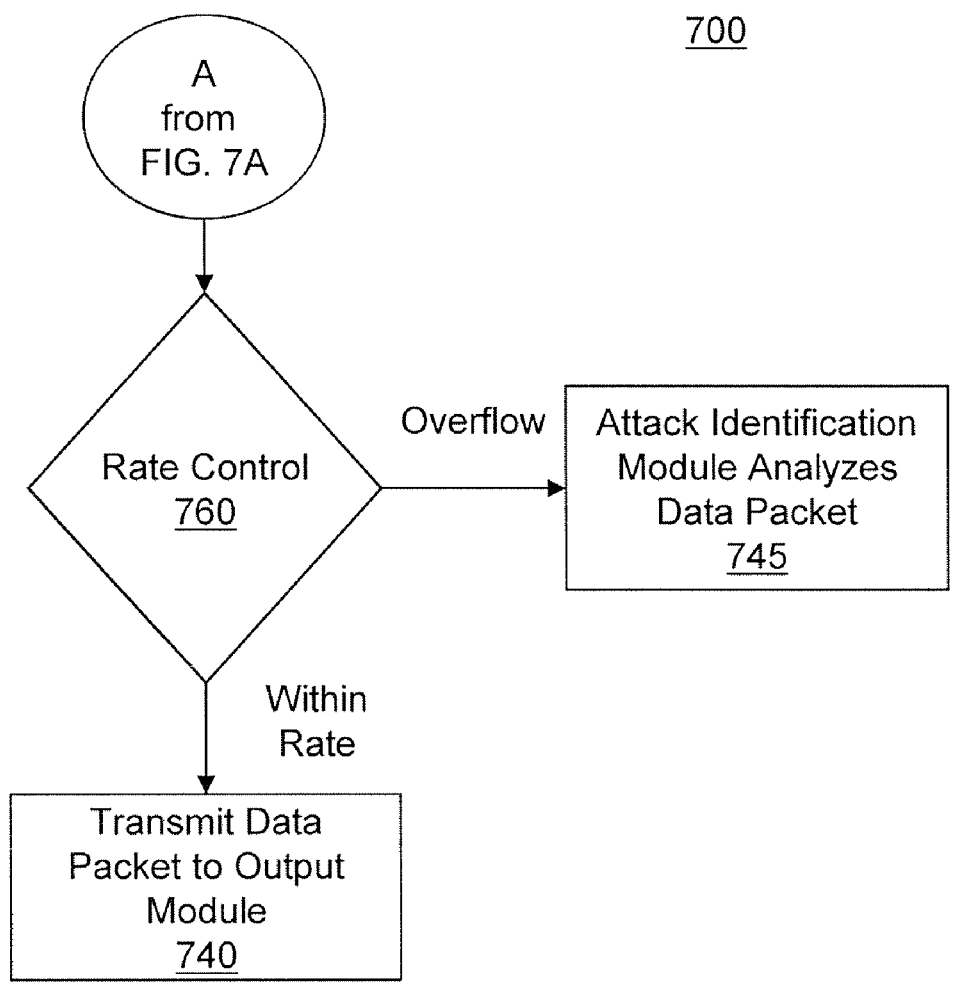

FIGS. 7A and 7B show a flowchart 700 depicting the processing of a data packet through the exemplary system 100 of FIG. 1. A data packet is received (710) from the input module 110 at the no access list module 120. The no access list module 120 analyzes (720) the data packet to determine if the data packet matches a no access list entry in a no access list. If the data packet matches a no access list entry in the no access list, then the data packet is discarded (725) at the discard module 125. If the data packet does not match a no access list entry in the no access list, then the data packet is transmitted to the first access list module 130. The first access list module analyzes (730) the data packet using the first access list. If the data packet matches a first access list entry in the first access list, then the data packet is transmitted to the first access list transmission module. The first access list transmission module rate controls (735) the data packet. If the data packet overflows the rate control of the first access list transmission module, then the data packet is transmitted to the attack identification module 160. The attack identification module 160 analyzes (745) the data packet to determine if that packet is from an attacker. If the data packet is within the rate limit of the rate control of the first access list transmission module, then the data packet is transmitted (740) to the output module 170.

If the data packet does not match a first access list entry in the first access list, then the data packet is transmitted to the second access list module 140. The second access list module 140 analyzes (750) the data packet using the second access list. If the data packet matches a second access list entry in the second access list, then the data packet is transmitted to the second access list transmission module. The second access list transmission module rate controls (755) the data packet. If the data packet overflows the rate control of the second access list transmission module, then the data packet is transmitted to the attack identification module 160. The attack identification module 160 analyzes (745) the data packet to determine if it is from an attacker. If the data packet is within the rate of the rate control of the second access list transmission module, then the data packet is transmitted (740) to the output module 170.

If the data packet does not match a second access list entry in the second access list, then the data packet is transmitted to the transmission module 150. The transmission module 150 rate controls (760) the data packet. If the data packet overflows the rate control of the transmission module 150, then the data packet is transmitted to the attack identification module 160. The attack identification module 160 analyzes (745) the data packet to determine if it is from an attacker. If the data packet is within the rate of the rate control of the transmission module, then the data packet is transmitted (740) to the output module 170.

Using, for example, the exemplary system 200 of FIG. 2 and the data packet of FIG. 6E, the data packet 600e is received (710). The no access list module 205 analyzes (720) the data packet 600e using the no access list 210. The data packet 600e is depicted by the diagram in FIG. 6E. The data packet 600e includes the parameters 610e which depict the source address as 10.99.99.98 and the data 615e which depicts an attempt to connect to a voice over internet protocol (VOIP) module in the output module 170 multiple times. The no access list as depicted in Table 1 includes the no access list entry F 211f which is network address=10.99.99.98. The no access module 205 analyzes the data packet 600e and determines that the source address, 10.99.99.98, of the data packet 600e matches the no access list entry F 211f, network address=10.99.99.98. Since the information associated with the data packet 600e, the source network address, matches an entry in the no access list 210, no access list entry F 211f, then the data packet 600e is transmitted to the discard module 125. The discard module 125 discards (725) the data packet 600e.

Using, for example, the exemplary system 300 of FIG. 3 and the data packet of FIG. 6C, the first access list module 305 analyzes (730) the data packet 600c using the first access list 310. The data packet 600c is depicted by the diagram in FIG. 6C. The data packet 600c includes the parameters 610c which depict the source address as 10.20.34.10 and the data 615c which depicts an attempt to connect to a voice over internet protocol (VOIP) module in the output module 170 and an attempt to open a phone connection to 945-555-3213. The first access list 310 as depicted in Table 2 includes the first access list entry E 311e which is network subnet address 10.20.34.0. The no access list module 120 analyzes (720) the data packet 600c and determines that the data packet 600c does not match any of the no access list entries in the no access list. Since the data packet 600c does not match any of the no access list entries, the data packet 600c is transmitted to the first access list module 305. The first access list module 305 analyzes (730) the data packet 600c and determines that the source address, 10.20.34.10, of the data packet 600c matches the first access list entry E 311e, network subnet=10.20.34.0. Since the information associated with the data packet 600c, the source network address, matches an entry in the first access list 310, first access list entry E 311e, then the data packet 600c is transmitted to the transmission module E 320e for rate control (735). The transmission module E 320e rate controls (735) the transmission of the data packet 600c. If the transmission of the data packet 600c overflows the rate control, then the data packet 600c is transmitted to the attack identification module 160 for analysis (745). If the transmission of the data packet 600c is within the rate control, then the data packet 600c is transmitted to the output module 170.

Using, for example, the exemplary system 100 of FIG. 1 and the data packet 600a of FIG. 6A, the data packet 600a is received (710). The data packet 600a is analyzed (720) by the no access list module 120 and does not match any of the no access list entries in the no access list. The data packet 600a is analyzed (730) by the first access list module 305 and does not match any of the first access list entries in the first access list. The data packet 600a is analyzed (750) by the second access list module 140 and does not match any of the second access list entries in the second access list. The data packet 600a is transmitted to the transmission module 150 which rate controls (760) the transmission of the data packet 600a to the output module. The data packet 600a is within the rate of the rate control and is transmitted (740) to the output module 170. The data packet 600a is routed to the admission control module, address 192.168.1.232:80. The admission control module processes the data packet 600a and determines the data packet 600a contains a request for service in its data 615a, Register Client Phone=10.20.2.2. The request for service is associated with a high bandwidth customer. The admission control module generates a new first access list entry from the data 615a in the data packet 600a. The new first access list entry includes the network address 10.20.2.2. The admission control module transmits the new first access list entry to the first access list module 130 which adds the new first access list entry to the first access list.

Using, for example, the exemplary system 400 of FIG. 4 and the data packet 600b of FIG. 6B, the data packet 600b is received (710). The data packet 600b is analyzed (720) by the no access list module 120 and does not match any of the no access list entries in the no access list. The data packet 600b is analyzed (730) by the first access list module 130 and does not match any of the first access list entries in the first access list. The data packet 600b is analyzed (750) by the second access list module 405 and does not match any of the second access list entries in the second access list. The data packet 600b is transmitted to the transmission module 150 which rate controls (760) the transmission of the data packet 600b to the output module. The data packet 600b is within the rate of the rate control and is transmitted (740) to the output module 170. The data packet 600b is routed to the admission control module 330, address 192.168.1.232:1025. The admission control module 330 processes the data packet 600b and determines the data packet 600b contains a request for service in its data 615b, Register Client Phone=10.10.10.10. The request for service is associated with a standard customer. The admission control module 330 transmits the data 615b, network address 10.10.10.10, in the data packet 600b to the index module 410. The index module 410 hashes the network address of the data packet 600b to generate a bin identification, B, and a user signature, CA432. The index module 410 processes the bin identification, B, to associate the user signature to the second bin 420b, bin id is B. The index module 410 transmits the user signature, CA432, to the second bin 420b. The second bin 420b processes the user signature to determine if the user signature exists in the second bin 420b. If the user signature exists, then the second bin 420b discards the new user signature. If the user signature does not exist, then the second bin 420b adds the user signature, CA432, to the second bin 420b.

Figure 8:
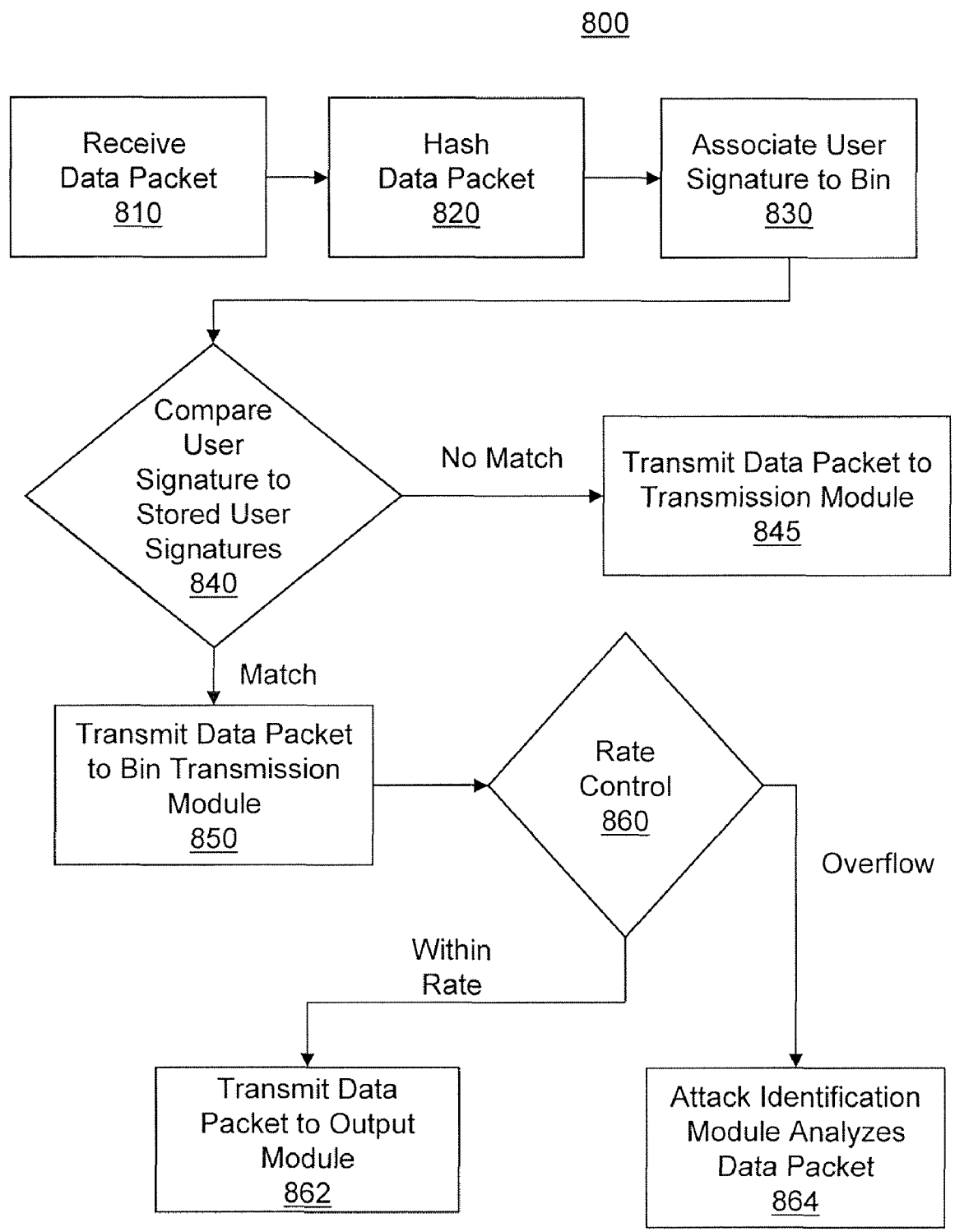
FIG. 8 is a flowchart depicting the processing of a data packet through the second access list module of an exemplary system.

FIG. 8 is a flowchart 800 depicting the processing of a data packet through the second access list module 405 of the exemplary system 400 of FIG. 4. A data packet is received (810) at the index module 410. The index module 410 hashes (820) the data packet to generate a bin identification and a user signature. The index module 410 associates (830) the bin identification to a bin module 420a or 420b. The bin module 420a or 430b compares (840) the user signature to zero or more stored user signatures 421 or 422, respectively. If the user signature does not match any of the stored user signatures 421 or 422 associated with the bin module 420a or 420b, respectively, then the data packet is transmitted (845) to the transmission module 150. If the user signature matches one of the stored user signatures 421 or 422 associated with the bin module 420a or 420b, respectively, then the data packet is transmitted (850) to the bin transmission module 430a or 430b.

The bin transmission module 430a or 430b rate controls (860) the transmission of the data packet. If the transmission is within the rate of the rate control, then the data packet is transmitted (862) to the output module 170. If the transmission is not within the rate of the rate control, then the data packet is analyzed (864) by the attack identification module 160. An advantage to the exemplary system 400 is that if an attacker's data packets are associated with a bin module 420a or 420b and match any of the stored user signatures 421 or 422, respectively, then the bin transmission module 430a or 430b will control the rate of the data packets to ensure that the attacker is not able to prevent most of the legitimate network traffic. Another advantage to the exemplary system 400 is that even if an attacker is associated with a bin module 420a or 420b and matches a user signature 421 or 422 in the bin module 420a or 420b, respectively, then only the output from the matched bin module 420a or 420b and not the output from the rest of the plurality of bin modules will be affected.

Using, for example, the exemplary system 400 of FIG. 4 and the data packet 600d of FIG. 6D, the data packet 600d is received (810). The index module 410 hashes (820) the parameters 610d of the data packet 600d to generate a bin identification, A2B, and a user signature, A4B3C2. The index module 410 associates (830) the bin identification, A2B, to the bin module B 420b. The user signature is compared (840) by the bin module B 420b to determine if it matches one of the stored user signatures 422. A user signature of A4B3C2 was stored in the bin module B 420b by a user request through the admission control module 330. The user signature, A4B3C2, matches the stored user signature, A4B3C2, and the data packet 600d is transmitted (850) to the bin module B transmission module 430b. The bin module B transmission module 430b rate controls (860) the transmission of the data packet 600d. The data packet 600d is within the rate of the rate control and is transmitted (862) to the output module 170. The data packet 600d is received by a SMS module, address 192.168.1.232:1025, and the data 615d in the data packet 600d is processed by the SMS module.

Figure 9:
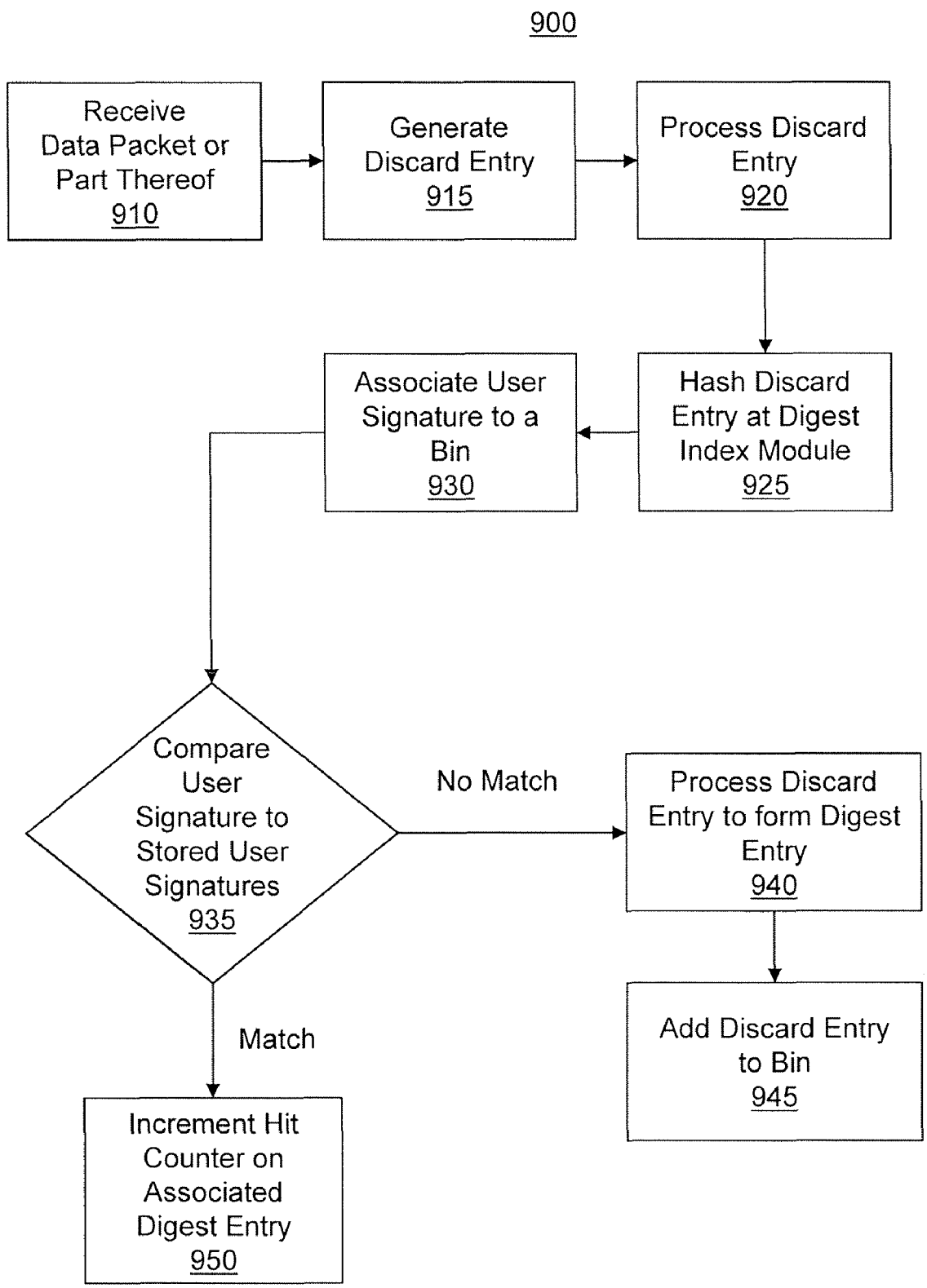
FIG. 9 is a flowchart depicting the processing of a data packet through the attack identification module of an exemplary system.

FIG. 9 is a flowchart 900 depicting the processing of a data packet through the attack identification module 505 of the exemplary system 500 of FIG. 5. A data packet or a part thereof is received (910) at a discard processing module 510. The discard processing module 510 generates (915) a discard entry (e.g., 512a). In some examples, the generation (915) of the discard entry (e.g., 512a) is the storing of parts of the data packet (e.g., header fields) in the discard processing module 510.

The discard entry (e.g., 512a) is processed (920) at the discard processing module 510. The processing (920) includes incrementing the count entry 511. The discard entry (e.g., 512a) is transmitted to the digest index module 530 which hashes (925) the discard entry (e.g., 512a) to generate a bin identification and a user signature. The bin identification is used to associate (930) the user signature to a digest bin module 540a or 540b. The user signature is compared (935) to the stored user signatures associated with the digest entries (e.g., 541a) associated with the matched digest bin module 540a or 540b. If the user signature matches any of the stored user signatures associated with the digest entries (e.g., 541a) associated with the matched digest bin module 540a or 540b, then the hit counter on the digest entry associated digest entry (e.g., 541a) is incremented (950). If the user signature does not match part or all of one of the stored user signatures associated with the digest entry (e.g., 541a) associated with the matched digest bin module 540a or 540b, then the discard entry(e.g., 512a) is processed (940) to form a digest entry (e.g., 541a). The new digest entry is added to the matched digest bin module 540a or 540b.

Using, for example, the exemplary system 500 of FIG. 5 and the data packet 600f of FIG. 6F, the data packet 600f is received (910) at the attack identification module 505. The data packet 600f is transmitted to the discard processing module 510 which generates (915) a new discard entry. The new discard entry is processed (920) by incrementing the count entry 511. The new discard entry is hashed (925) by the digest index module 530 to generate a bin identification, B, and a user signature, B44523. The bin identification is used to associate (930) the user signature to a digest bin module B 540b. Digest bin module B 540b includes digest entry 1Z 544b. The user signature of digest entry 1Z 544b is B44523. The digest bin module B 540b compares (935) the user signature of the new discard entry to the stored user signatures. The user signature of the new discard entry matches the stored user signature of digest entry BZ 542d. The hit counter for digest entry BZ 542d is incremented (950).

Figure 10:
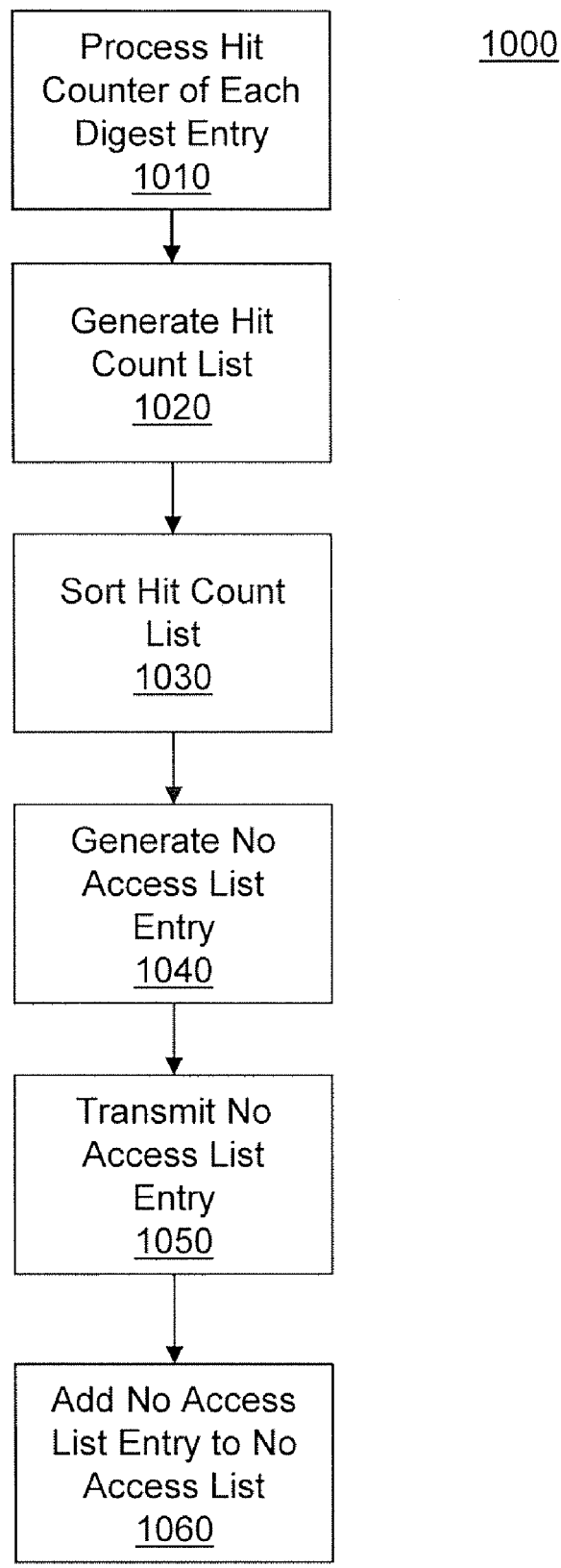
FIG. 10 is a flowchart depicting the processing of a hit counter to detect attacks in an exemplary system.

FIG. 10 is a flowchart 1000 depicting the processing of a hit counter to detect attacks in the exemplary system 500 of FIG. 5. The hit counter of each digest entry (e.g., 541a) is processed (1010) by the attack identification module 505. The hit counter of each digest entry (e.g., 541a) is used to generate (1020) a hit count list. The hit count list is sorted (1030). The top entry of the hit count list is used to generate (1040) a no access list entry. The no access list entry is transmitted (1050) to the no access list module. The no access list module adds (1060) the no access list entry to the no access list.

For example, the hit counter of each digest entry (see e.g., Table 5) is processed (1010) by the attack identification module 505. The hit counter of each digest entry (see e.g., Table 5) is used to generate (1020) a hit count list (see e.g., Table 5). The hit count list is sorted (1030) (see e.g., Table 5). The top entry of the hit count list, Digest Entry BF 542b with 4,532,135 total hits, is used to generate (1040) two no access list entries. The first no access list entry includes the Digest Entry BF 542b network address, 10.45.13.23. The second no access list entry includes the Digest Entry BZ 542d network subnet, 10.45.13.0. The two no access list entries are transmitted (1050) to the no access list module. The no access list module adds (1060) the two no access list entries, Digest Entry BF 542b and Digest Entry BZ 542d, to the no access list.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®. The IP phone includes, for example, a Cisco® Unified IP Phone 7985G available from Cisco System, Inc, and/or a Cisco® Unified Wireless Phone 7920 available from Cisco System, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method of identifying attackers on a network, the method comprising:
    receiving a data packet or part thereof at a discard processing module;
    generating a discard entry for the data packet;
    receiving the discard entry at a digest index module;
    hashing the discard entry using one or more fields in the discard entry to generate a bin identification and a user signature;
    processing the bin identification to associate the user signature with a first bin included in a plurality of bins, wherein each bin in the plurality of bins has a capacity;
    incrementing a discard count if the data packet cannot be processed because the first bin exceeds its capacity;
    processing the discard entry at the first bin into a first digest entry, wherein the first digest entry comprises identifying information associated with the data packet and a hit counter;
    incrementing a count entry for the data packet received at the discard processing module;
    incrementing a processed count for the data packet received at the digest index module;
    calculating a difference between the count entry and the processed count; and
    reporting the difference.

2. The method of claim 1, wherein the identifying information is a network address, a network subnet address, an internet protocol (IP) address, a media access control (MAC) address, a networking protocol header field, meta-data associated with the data packet, an arrival interface, a destination interface, an origination interface, or combinations thereof.

3. The method of claim 1, wherein processing the discard entry at the first bin comprises comparing the identifying information of the discard entry to one or more stored fields associated with the first bin.

4. The method of claim 1, further comprising:
    comparing the user signature of the discard entry to one or more stored user signatures associated with the first bin.

5. The method of claim 4, wherein if the user signature of the discard entry matches a stored user signature, then the hit counter is incremented on the first digest entry associated with the stored user signature.

6. The method of claim 4, wherein the user signature of the discard entry does not match the one or more stored user signatures associated with the first bin.

7. The method of claim 6, further comprising:
    processing the first bin to determine capacity of the first bin;
    processing the discard entry into a second digest entry; and
    adding the second digest entry to the first bin.

8. The method of claim 7, wherein the second digest entry comprises identifying information associated with the data packet, a timestamp, a user signature, a hit counter, a packet field, packet meta data, an uniqueness indicator, or combinations thereof.

9. The method of claim 6 further comprising:
    processing the first bin to determine capacity of the first bin; and
    processing each digest entry of the first bin based on the capacity to determine age and hit count.

10. The method of claim 1, further comprising:
    comparing the user signature of the discard entry to one or more stored user signatures associated with the first bin, wherein the user signature of the discard entry does not match the one or more stored user signatures associated with the first bin;

processing the first bin to determine capacity of the first bin;
processing the discard entry into a second digest entry;
adding the second digest entry to the first bin, wherein the second digest entry comprises identifying information associated with the data packet, a timestamp, a user signature, a hit counter, a packet field, packet meta data, an uniqueness indicator, or combinations thereof;
processing the timestamp and the hit counter of each digest entry in the plurality of bins wherein the timestamp comprises a plurality of time entries; and
generating a hit rate list.

11. The method of claim 10, further comprising:
generating a report comprising the hit rate list; and
transmitting the report to a display device.

12. The method of identifying attackers on a network, the method comprising:
receiving a data packet or part thereof at a discard processing module;
generating a discard entry for the data packet;
receiving the discard entry at a digest index module;
hashing the discard entry using one or more fields in the discard entry to generate a bin identification and a user signature;
processing the bin identification to associate the user signature with a first bin included in a plurality of bins, wherein each bin in the plurality of bins has a capacity;
incrementing a discard count if the data packet cannot be processed because the first bin exceeds its capacity;
processing the discard entry at the first bin into a first digest entry, wherein the first digest entry comprises identifying information associated with the data packet and a hit counter;
comparing the user signature of the discard entry to one or more stored user signatures associated with the first bin, wherein the user signature of the discard entry does not match the one or more stored user signatures associated with the first bin;
processing the first bin to determine capacity of the first bin;
processing the discard entry into a second digest entry;
adding the second digest entry to the first bin, wherein the second digest entry comprises identifying information associated with the data packet, a timestamp, a user signature, a hit counter, a packet field, packet meta data, an uniqueness indicator, or combinations thereof;
processing the timestamp and the hit counter of each digest entry in the plurality of bins wherein the timestamp comprises a plurality of time entries; and
generating a hit rate list.

13. The method of claim 12, further comprising:
generating a report comprising the hit rate list; and
transmitting the report to a display device.

14. The method of claim 12, further comprising:
generating one or more no access list entries comprising entries of the hit rate list;
receiving at a no access list module the one or more no access list entries; and
adding the one or more no access list entries to a no access list.

15. The method of claim 12, wherein the discard processing module is a ring buffer, a queue, a first in first out queue, a first in last out queue, or combinations thereof.

16. The method of claim 12, further comprising:
processing each digest entry in the plurality of bins;
generating a report of processed information.

17. The method of claim 16, wherein the processed information is a network address, a source address, a destination address, a network interface, a port, a source port, a destination port, or combinations thereof.

18. The method of claim 12, wherein the identifying information is a network address, a network subnet address, an internet protocol (IP) address, a media access control (MAC) address, a networking protocol header field, meta-data associated with the data packet, an arrival interface, a destination interface, an origination interface, or combinations thereof.

19. The method of claim 12, wherein processing the discard entry at the first bin comprises comparing the identifying information of the discard entry to one or more stored fields associated with the first bin.

20. A method of identifying attackers on a network, the method comprising:
receiving a data packet or part thereof at a discard processing module;
generating a discard entry for the data packet;
receiving the discard entry at a digest index module;
hashing the discard entry using one or more fields in the discard entry to generate a bin identification and a user signature;
processing the bin identification to associate the user signature with a first bin included in a plurality of bins, wherein each bin in the plurality of bins has a capacity;
incrementing a discard count if the data packet cannot be processed because the first bin exceeds its capacity;
processing the discard entry at the first bin into a first digest entry, wherein the first digest entry comprises identifying information associated with the data packet and a hit counter;
comparing the user signature of the discard entry to one or more stored user signatures associated with the first bin, wherein the user signature of the discard entry does not match the one or more stored user signatures associated with the first bin;
processing the first bin to determine capacity of the first bin;
processing each digest entry of the first bin based on the capacity to determine age and hit count;
deleting a second digest entry of the first bin based on the age and the hit count;
incrementing an overwrite count for the second digest entry deleted at the first bin; and
processing the overwrite count at the digest index module.

21. The method of claim 20, further comprising:
deleting the second digest entry with lowest hit count.

22. A method of identifying attackers on a network, the method comprising:
receiving a data packet or part thereof at a discard processing module;
generating a discard entry for the data packet;
receiving the discard entry at a digest index module;
hashing the discard entry using one or more fields in the discard entry to generate a bin identification and a user signature;
processing the bin identification to associate the user signature with a first bin included in a plurality of bins, wherein each bin in the plurality of bins has a capacity;
incrementing a discard count if the data packet cannot be processed because the first bin exceeds its capacity;
processing the discard entry at the first bin into a first digest entry, wherein the first digest entry comprises identifying information associated with the data packet and a hit counter;

comparing the user signature of the discard entry to one or more stored user signatures associated with the first bin, wherein the user signature of the discard entry does not match the one or more stored user signatures associated with the first bin;

processing the first bin to determine capacity of the first bin;

processing each digest entry of the first bin based on the capacity to determine age and hit count;

deleting the discard entry based on the age and the hit count of each said digest entry of the first bin;

incrementing the discard count for the discard entry; and processing the discard count at the digest index module.

23. A method of identifying attackers on a network, the method comprising:

receiving a data packet or part thereof at a discard processing module;

generating a discard entry for the data packet;

receiving the discard entry at a digest index module;

hashing the discard entry using one or more fields in the discard entry to generate a bin identification and a user signature;

processing the bin identification to associate the user signature with a first bin included in a plurality of bins;

processing the discard entry at the first bin, comprising comparing the user signature of the discard entry to one or more stored user signatures associated with the first bin;

wherein the user signature of the discard entry does not match the one or more stored user signatures associated with the first bin;

processing the first bin to determine capacity of the first bin;

processing the discard entry into a second digest entry;

adding the second digest entry to the first bin, wherein the second digest entry comprises identifying information associated with the data packet, a timestamp, a user signature, a hit counter, a packet field, packet meta data, an uniqueness indicator, or combinations thereof;

processing the timestamp and the hit counter of each digest entry in the plurality of bins wherein the timestamp comprises a plurality of time entries; and generating a hit rate list.

24. The method of claim 23, further comprising:
generating a report comprising the hit rate list; and
transmitting the report to a display device.

25. The method of claim 23, further comprising:
generating one or more no access list entries comprising entries of the hit rate list;
receiving at a no access list module the one or more no access list entries; and
adding the one or more no access list entries to a no access list.

26. A method of identifying attackers on a network, the method comprising:

receiving a data packet or part thereof at a discard processing module;

generating a discard entry for the data packet;

receiving the discard entry at a digest index module;

hashing the discard entry using one or more fields in the discard entry to generate a bin identification and a user signature;

processing the bin identification to associate the user signature with a first bin included in a plurality of bins;

processing the discard entry at the first bin, comprising comparing the user signature of the discard entry to one or more stored user signatures associated with the first bin;

wherein the user signature of the discard entry does not match the one or more stored user signatures associated with the first bin;

processing the first bin to determine capacity of the first bin;

processing each digest entry of the first bin based on the capacity to determine age and hit count;

deleting a second digest entry of the first bin based on the age and the hit count;

incrementing an overwrite count for the second digest entry deleted at the first bin; and processing the overwrite count at the digest index module.

27. The method of claim 26, further comprising:
deleting the discard entry based on the age and the hit count of each said digest entry of the first bin;
incrementing a discard count for the discard entry; and
processing the discard count at the digest index module.

* * * * *